(12) United States Patent
Kinoshita

(10) Patent No.: US 7,762,644 B2
(45) Date of Patent: Jul. 27, 2010

(54) DRAWING SYSTEM, LIQUID MATERIAL DRAWING METHOD, COLOR FILTER MANUFACTURING METHOD, AND ORGANIC EL ELEMENT MANUFACTURING METHOD

(75) Inventor: Toyotaro Kinoshita, Mie (JP)

(73) Assignee: Seiko Epson Corporation, Tokyo (JP)

( * ) Notice: Subject to any disclaimer, the term of this patent is extended or adjusted under 35 U.S.C. 154(b) by 299 days.

(21) Appl. No.: 11/948,334

(22) Filed: Nov. 30, 2007

(65) Prior Publication Data
US 2008/0136853 A1    Jun. 12, 2008

(30) Foreign Application Priority Data
Dec. 8, 2006    (JP) .............................. 2006-331351

(51) Int. Cl.
*B41J 29/393* (2006.01)

(52) U.S. Cl. .......................................... 347/19; 347/15

(58) Field of Classification Search ................... 347/12, 347/14, 15, 19, 40, 43, 41
See application file for complete search history.

(56) References Cited
U.S. PATENT DOCUMENTS

| | | | |
|---|---|---|---|
| 6,354,689 B1 * | 3/2002 | Couwenhoven et al. | 347/19 |
| 6,645,029 B2 | 11/2003 | Akahira | |
| 6,692,095 B1 | 2/2004 | Marumoto et al. | |
| 2006/0181565 A1 | 8/2006 | Arazaki | |

FOREIGN PATENT DOCUMENTS

| | | | |
|---|---|---|---|
| JP | H11-072612 A | 3/1999 |
| JP | 2001-228321 A | 8/2001 |
| JP | 2003-275650 A | 9/2003 |
| JP | 2006-015243 A | 1/2006 |
| JP | 2006-130383 A | 5/2006 |
| KR | 2006-0091260 A | 8/2006 |

\* cited by examiner

*Primary Examiner*—Lamson D Nguyen
(74) *Attorney, Agent, or Firm*—Global IP Counselors, LLP

(57) ABSTRACT

A drawing system for discharging a liquid material from a plurality of nozzles to a plurality of pixel regions on a substrate includes a memory unit, an arrangement information generation unit and a droplet discharge device. The memory unit is configured to store at least nozzle information in which the nozzles are ranked according to discharge characteristics and first arrangement information that indicates an arrangement of each of the nozzles with respect to each of the pixel regions in the relative movement. The arrangement information generation unit is configured to generate second arrangement information in which the first arrangement information is corrected based on the nozzle information. The droplet discharge device is configured to select one of the first arrangement information and the second arrangement information and to discharge droplets of the liquid material on each of the pixel regions from the nozzles according to the selected arrangement information.

20 Claims, 18 Drawing Sheets

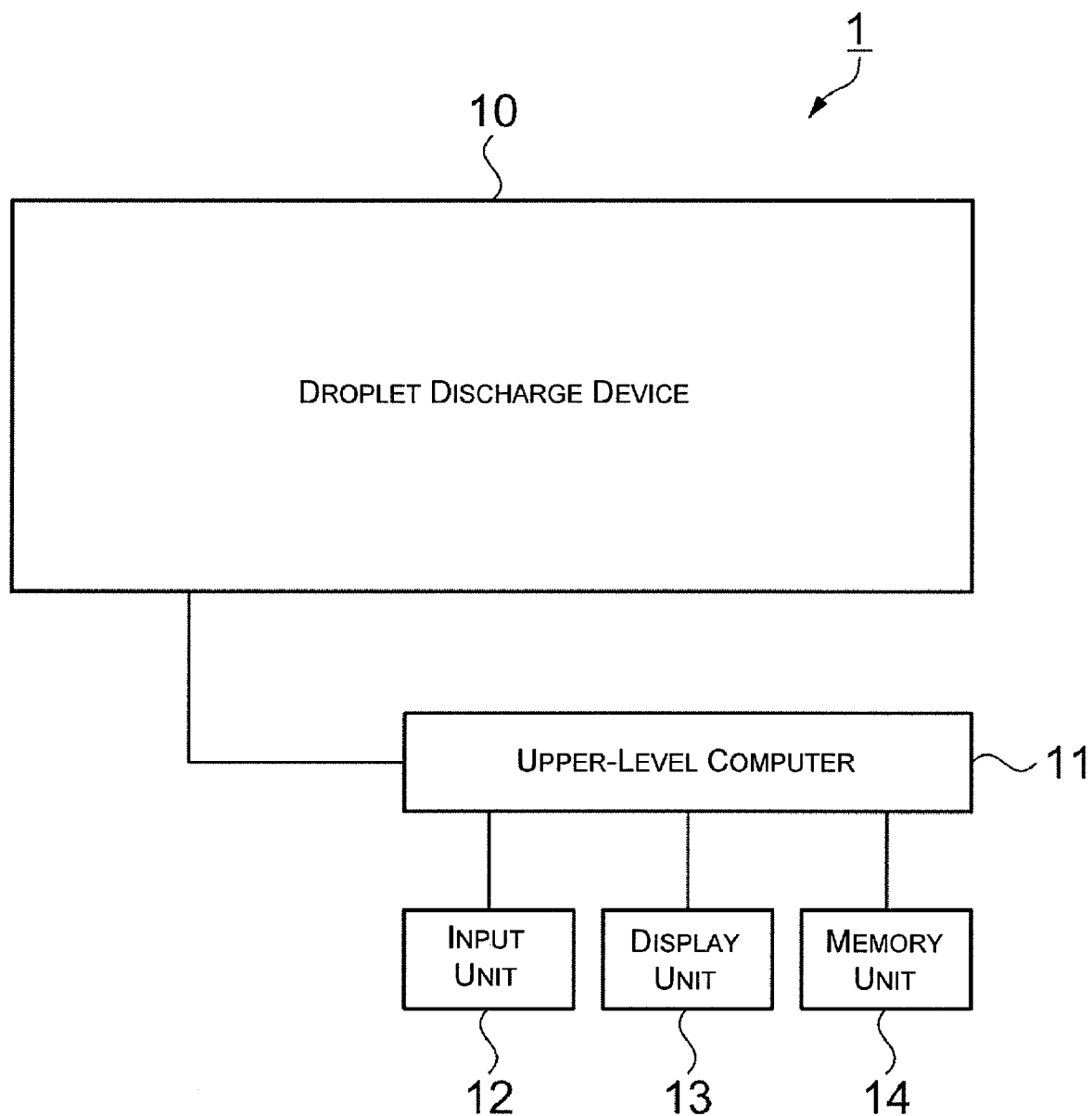
F I G. 1

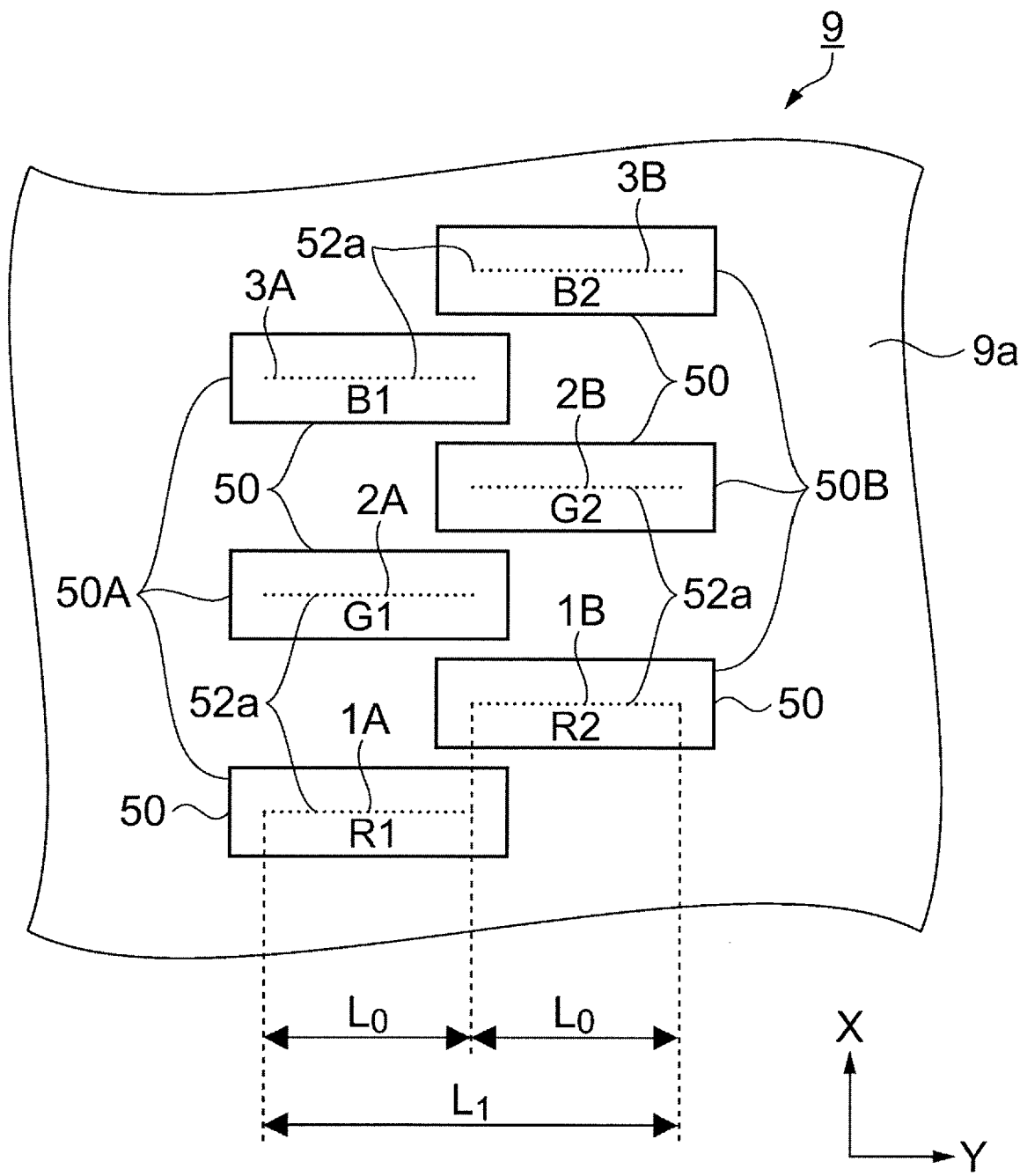
F I G. 4

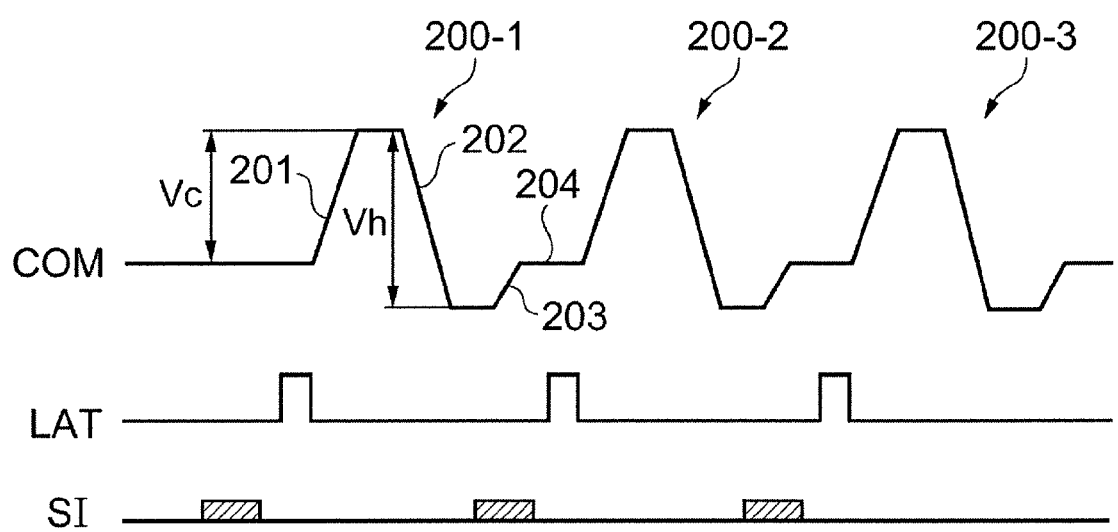
F I G. 7

| NOZZLE NO. | MISSING DISCHARGE | LANDING DIAMETER | | LANDING POSITION | |
|---|---|---|---|---|---|
| | | Too Large | Too Small | X | Y |
| N1 | 0 | 0 | 0 | 0 | 0 |
| N2 | 1 | 0 | 0 | 0 | 0 |
| N3 | 0 | 0 | 0 | +40 | 0 |
| N4 | 0 | 0 | 1 | 0 | 0 |
| N5 | 0 | 1 | 0 | 0 | 0 |
| N6 | 0 | 0 | 0 | −20 | 0 |

FIG. 12

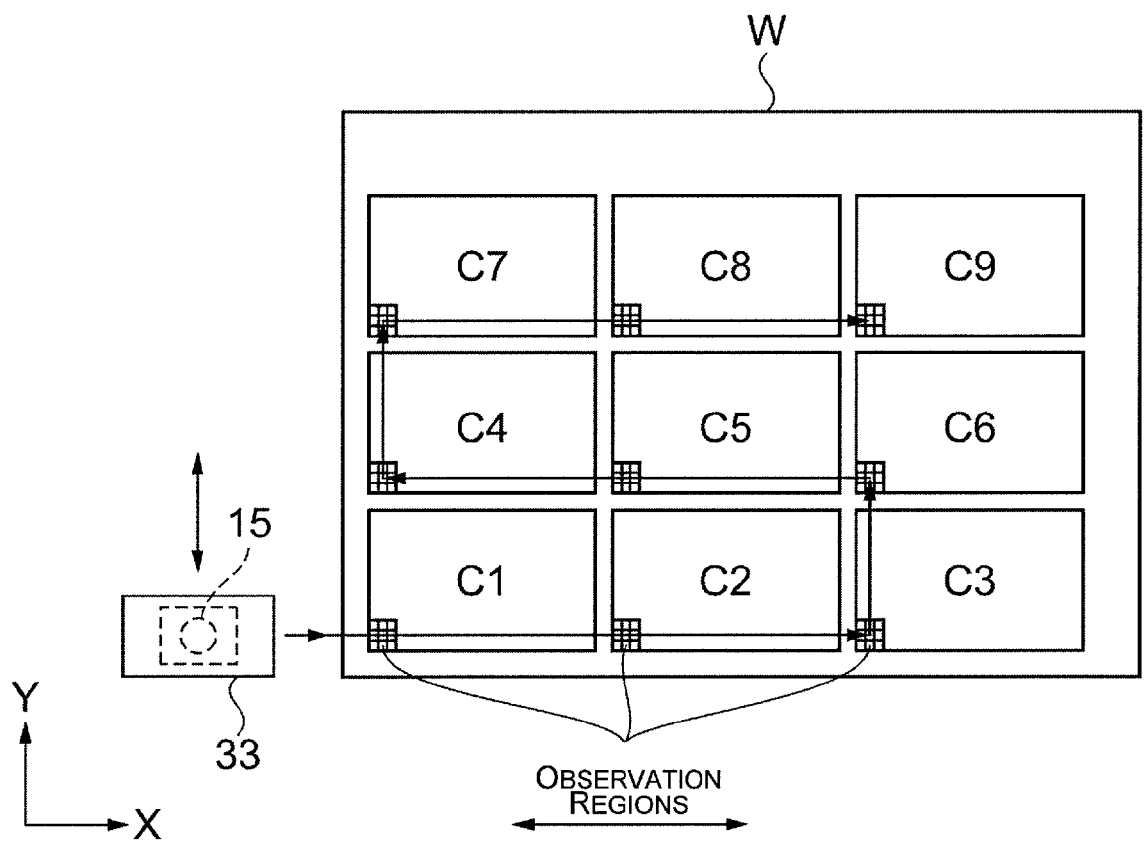
F I G. 16

DRAWING SYSTEM, LIQUID MATERIAL DRAWING METHOD, COLOR FILTER MANUFACTURING METHOD, AND ORGANIC EL ELEMENT MANUFACTURING METHOD

CROSS-REFERENCE TO RELATED APPLICATIONS

This application claims priority to Japanese Patent Application No. 2006-331351 filed on Dec. 8, 2006. The entire disclosure of Japanese Patent Application No. 2006-331351 is hereby incorporated herein by reference.

BACKGROUND

1. Technical Field

The present invention relates to a drawing system that uses a liquid droplet discharge method, to a liquid material drawing method, to a color filter manufacturing method, and to an organic EL element manufacturing method.

2. Related Art

Japanese Laid-Open Patent Application Publication No. 2003-275650 discloses an example of known drawing systems that uses a droplet discharge method including a drawing system for drawing one or more chip-shaped regions on a workpiece by causing functional droplets to be selectively discharged from a plurality of nozzles provided to a functional-droplet discharge head while causing the functional-droplet discharge head to move relative to the workpiece based on data that are stored in a recording medium.

In the abovementioned drawing system, the functional droplets are discharged and drawn on the workpiece based on discharge pattern data of each nozzle that are stored in the recording medium.

The abovementioned discharge pattern data are generated based on at least chip information relating to the position of a chip formation region on the workpiece, pixel information relating to the arrangement of pixels in a chip formation region, and nozzle information relating to the arrangement of the nozzles with respect to the workpiece.

Japanese Laid-Open Patent Application Publication No. 2006-130383 (page 7) discloses a known method for detecting defects in the liquid material discharge including a dot deviation detection method and a dot deviation detection device capable of simply and rapidly detecting a dot misalignment obtained from the landing of a droplet discharged from a nozzle of the droplet discharge head onto a detection object.

SUMMARY

When a color filter or other pixel formation element is formed on a workpiece using a droplet discharge method, the droplets must be stably discharged from the nozzles. However, nozzle blockage, flight deviation in which there is a deviation in the landing position of the discharged droplets, and other defects may occur, and it is difficult to always perform stable discharge. In the above mentioned reference (Japanese Laid-Open Patent Application Publication No. 2006-130383), the provision of a dot deviation detection device to the droplet discharge device helps to enhance the product yield. However, no method has been proposed for effective introduction to a drawing system such as that of Prior Art 1 in actual practice.

The present invention was developed in view of the foregoing problems, and an object of the present invention is to provide a drawing system capable of reducing defects in liquid material discharge, and to provide a liquid material drawing method, a color filter manufacturing method, and an organic EL element manufacturing method.

The drawing system of the first aspect of the present invention is drawing system for discharging a liquid material including a functional material from a plurality of nozzles to a plurality of pixel regions on a substrate in synchronization with a relative movement of the substrate and the nozzles to form pixel formation elements. The drawing system includes a memory unit, an arrangement information generation unit, and a droplet discharge device. The memory unit is configured and arranged to store at least nozzle information in which the nozzles are ranked according to discharge characteristics and first arrangement information that indicates an arrangement of each of the nozzles with respect to each of the pixel regions in the relative movement. The arrangement information generation unit is configured and arranged to generate second arrangement information in which the first arrangement information is corrected based on the nozzle information. The droplet discharge device is configured and arranged to select one of the first arrangement information and the second arrangement information and to discharge droplets of the liquid material on each of the pixel regions from the nozzles according to the one of the first arrangement information and the second arrangement information selected.

According to this configuration, nozzles that have discharge characteristics whereby liquid material discharge defects occur are ranked as nozzle information. The arrangement information generation unit can correct the first arrangement information according to the discharge characteristics based on the nozzle information stored in the memory unit when there are ranked nozzles. Consequently, the droplet discharge device can reference the nozzle information to select the first arrangement information or the second arrangement information to discharge the liquid material. Specifically, a drawing system can be provided that is capable of reducing liquid material discharge defects.

A second aspect is wherein the plurality of nozzles is ranked in the nozzle information based on discharge characteristics that include landing position deviation of the droplets, discharge quantity abnormality, and missing discharge, the first arrangement information includes selection information of a nozzle for discharging the droplets, and the arrangement information generation unit generates the second arrangement information in which the first arrangement information is corrected so that at least one nozzle ranked for each of the pixel regions is not selected, and another nozzle is selected to discharge the missing liquid material.

The nozzles that coincide with each pixel region through the abovementioned relative movement are not necessarily the same according to the size of the pixel region or the arrangement of the plurality of nozzles. Through this configuration, when any nozzle in which landing position deviation of the discharged droplets, discharge quantity abnormality, or missing discharge occurs coincides with a pixel region, at least one of the nozzles is not selected, and another nozzle is selected to discharge the missing liquid material. Since nozzles in which droplet discharge quantity abnormality or missing discharge occurs are ranked, a drawing system can be provided whereby missing liquid material is reduced, and the required amount is provided for each pixel region.

A third aspect is wherein the landing position deviation is divided into a direction of the relative movement and a direction orthogonal to the direction of the relative movement, and the arrangement information generation unit generates the second arrangement information in which the first arrangement information is corrected so that a relative discharge position of the plurality of nozzles with respect to the substrate is offset according to a direction of the landing position deviation.

According to this configuration, since the landing position deviation is divided into a direction of the relative movement and a direction orthogonal to the direction of the relative movement, the relative discharge position of the nozzles with respect to each pixel region can be precisely corrected according to the direction of the landing position deviation.

A configuration may be adopted in which the first arrangement information includes a drive condition of energy generation unit for each of the nozzles that discharges the droplets, and the arrangement information generation unit generates second arrangement information in which the drive condition of the nozzle in the first arrangement information is changed when a nozzle is present that has at least one discharge characteristic among the discharge quantity abnormality and the landing position deviation. The droplet discharge quantity and the landing position deviation can be adjusted by varying the drive conditions of the energy generation unit. The arrangement information generation unit thereby generates second arrangement information in which the drive condition of the nozzle in the first arrangement information is corrected when a nozzle is present in which discharge quantity abnormality or landing position deviation occurs. Consequently, a drawing system can be provided that is capable of producing the original discharge characteristics or discharge characteristics that approach the original discharge characteristics and providing the necessary quantity of liquid material for each pixel region by varying the drive conditions of the energy generation unit without needlessly stopping nozzles in which discharge defects occur.

In a preferred configuration, the discharge quantity abnormality is classified into too large or too small a landing diameter of the droplets, and the arrangement information generation unit varies a drive voltage of the energy generation unit for driving the nozzles in the first arrangement information according to whether the landing diameter is too large or too small. The arrangement information generation unit thereby varies the drive voltage of the energy generation unit for driving the nozzle in the first arrangement information according to whether the landing diameter is too large or too small, and a drawing system can therefore be provided that is capable of correcting an excessive or insufficient discharge quantity and discharging and drawing the liquid material.

In a preferred configuration, the landing position deviation is ranked according to a deviation amount in at least the relative movement direction, and the arrangement information generation unit varies a discharge timing of the energy generation unit for driving the nozzles in the first arrangement information according to the deviation amount. The arrangement information generation unit thereby varies the discharge timing of the nozzles that are ranked according to the deviation amount, and a drawing system can therefore be provided that is capable of landing a discharged droplet in the intended pixel region.

The deviation amount is preferably classified according to a forward direction or a backward direction with respect to positive movement and negative movement of the relative movement. When droplet flight deviation occurs, the deviation amount after landing varies according to whether the flight deviation direction is the forward direction or the backward direction with respect to positive and negative movement in the relative movement. According to this configuration, since the discharge timing is varied based on the deviation amount that is classified according to the forward direction or the backward direction with respect to positive and negative movement, a discharged droplet can be landed in the intended pixel region even when a nozzle in which flight deflection occurs is used in positive movement and negative movement.

The drawing system preferably further comprises an imaging mechanism for observing and capturing an image of the droplets discharged and landed on a landing observation discharge object from the plurality of nozzles, an image processing unit for converting the image captured by the imaging mechanism to image information, and a nozzle information generation unit for generating the nozzle information from the image information. Since an image processing unit for converting the image of the landed droplets to image information is provided by this configuration, missing discharge as a discharge defect, as well as landing position deviation and the landing diameter that fluctuates due to discharge abnormality can be obtained in the form of numerical data. The arrangement information generation unit can therefore generate second arrangement information in which the first arrangement information is more precisely corrected. Errors in image processing can also be reduced in comparison to a case in which these structures are provided separately from the image system for landing observation.

The landing observation discharge object is preferably a recording paper. According to this configuration, the use of recording paper reduces the effects of interfacial tension and the like of the surface on which the droplets are landed, and makes it possible to more reliably obtain information relating to the landing diameter or landing position deviation.

In a preferred configuration, the imaging mechanism is provided in a state that enables observation of the plurality of pixel regions of the substrate; at least the pixel regions with which the plurality of nozzles coincides through one cycle of the relative movement are observed and imaged among the plurality of pixel regions in which the liquid material is discharged and drawn; and the nozzle information generation unit identifies a defective nozzle based on the obtained image information, and updates the nozzle information based on the information of the defective nozzle. Due to the usage frequency of the nozzles, the service life, and other factors, the discharge characteristics of the plurality of nozzles are not necessarily always constant. According to this configuration, the liquid material that is discharged and drawn for each pixel region of the substrate is observed, a defective nozzle in which a discharge defect occurs is identified, and the nozzle information is updated based on the information of the defective nozzle. Accordingly, the arrangement information generation unit can generate second arrangement information in which the first arrangement information is corrected based on the newest nozzle information. Specifically, a drawing system can be provided in which a stable discharge state is obtained.

The liquid material drawing method of another aspect of the present invention is a liquid material drawing method for discharging a liquid material including a functional material from a plurality of nozzles to a plurality of pixel regions on a substrate in synchronization with a relative movement of the substrate and the nozzles to form pixel formation elements. The liquid material drawing method comprising following steps: storing at least nozzle information in which the nozzles are ranked according to discharge characteristics and first arrangement information that indicates an arrangement of each of the nozzles with respect to each of the pixel regions in the relative movement; generating second arrangement information in which the first arrangement information is corrected based on the nozzle information; selecting one of the first arrangement information and the second arrangement information; and discharging droplets of the liquid material on each of the pixel regions from the nozzles according to the one of the first arrangement information and the second arrangement information selected.

According to this method, nozzles having discharge characteristics whereby discharge defects occur are ranked in the nozzle information generation step. In the arrangement information generation step, second arrangement information in which the first arrangement information is corrected is generated based on the nozzle information in which the plurality of nozzles is ranked according to the discharge characteristics. Consequently, in the drawing step, the corrected second arrangement information is selected to discharge the liquid material when a nozzle in which a discharge defect occurs is present. Specifically, a liquid material drawing method can be provided that is capable of reducing liquid material discharge defects.

The liquid material drawing method is also wherein the nozzle information in which the plurality of nozzles is ranked based on discharge characteristics that include landing position deviation of the droplets, discharge quantity abnormality, and missing discharge is generated in the nozzle information generation step; the first arrangement information includes selection information of a nozzle for discharging the droplets; and the second arrangement information in which the first arrangement information is corrected so that at least one ranked nozzle is not selected, and another nozzle is selected to discharge the missing liquid material in the arrangement information generation step.

The nozzles that coincide with each pixel region through the abovementioned relative movement are not necessarily the same according to the size of the pixel region or the arrangement of the plurality of nozzles. Through this method, when any nozzle in which landing position deviation of the discharged droplets, discharge quantity abnormality, or missing discharge occurs coincides with a pixel region, second arrangement information is generated in which the first arrangement information is corrected so that at least one of the nozzles is not selected, and another nozzle is selected to discharge the missing liquid material in the arrangement information generation step. Since nozzles in which droplet discharge quantity abnormality or missing discharge occurs are ranked, a liquid material drawing method can be provided whereby the necessary quantity of the liquid material can be provided for each pixel region without inducing liquid material deficiency.

A configuration may be adopted in which the landing position deviation is divided into a direction of the relative movement and a direction orthogonal to the direction of the relative movement in the nozzle information generation step; and the second arrangement information in which a correction is made so that a relative discharge position of the plurality of nozzles with respect to the substrate is offset according to a direction of the landing position deviation is generated in the arrangement information generation step. According to this configuration, since the landing position deviation is divided into a direction of the relative movement and a direction orthogonal to the direction of the relative movement, the relative discharge position of the nozzles with respect to each pixel region can be precisely corrected according to the direction of the landing position deviation.

In a preferred configuration, the first arrangement information includes a drive condition of an energy generation unit for each of the nozzles that discharges the droplets; and second arrangement information in which the drive condition of the nozzle in the first arrangement information is changed when a nozzle is present that has at least one discharge characteristic among the discharge quantity abnormality and the landing position deviation is generated in the arrangement information generation step.

The droplet discharge quantity and the landing position can be adjusted by varying the drive conditions of the energy generation unit. Second arrangement information in which the drive condition of the nozzle in the first arrangement information is corrected is thereby generated in the arrangement information generation step when a nozzle is present in which discharge quantity abnormality or landing position deviation occurs. Consequently, a liquid material drawing method can be provided that is capable of producing the original discharge characteristics or discharge characteristics that approach the original discharge characteristics and providing the necessary quantity of liquid material for each pixel region by varying the drive conditions of the energy generation unit without needlessly stopping nozzles in which discharge defects occur.

In a preferred configuration, the discharge quantity abnormality is classified into too large or too small a landing diameter of the droplets in the nozzle information generation step, and a drive voltage of the energy generation unit for driving the nozzles in the first arrangement information is varied in the arrangement information generation step according to whether the landing diameter is too large or too small. According to this configuration, the drive voltage of the energy generation unit for driving the nozzles in the first arrangement information is varied according to whether the landing diameter is too large or too small in the arrangement information generation step, and a liquid material drawing method can therefore be provided that is capable of correcting an excessive or insufficient discharge quantity to discharge and draw the liquid material.

In a preferred configuration, the landing position deviation is ranked in the nozzle information generation step according to a deviation amount in at least the relative movement direction, and a discharge timing of the energy generation unit for driving the nozzles in the first arrangement information is varied in the arrangement information generation step according to the deviation amount. The discharge timing of the nozzles that are ranked according to the deviation amount is thereby varied in the arrangement information generation step, and a liquid material drawing method can therefore be provided that is capable of landing a discharged droplet in the intended pixel region.

The deviation amount is preferably classified according to a forward direction or a backward direction with respect to positive movement and negative movement of the relative movement. When droplet flight deviation occurs, the deviation amount after landing varies according to whether the flight deviation direction is the forward direction or the backward direction with respect to positive and negative movement in the relative movement. According to this configuration, since the discharge timing is varied based on the deviation amount that is classified according to the forward direction or the backward direction with respect to positive and negative movement, a discharged droplet can be landed in the intended pixel region even when a nozzle in which flight deflection occurs is used in positive movement and negative movement.

The nozzle information generation step preferably includes a landing observation step for obtaining the nozzle information by discharging the droplets of the liquid material onto a landing observation discharge object from the plurality of nozzles to observe and capture an image of the landed droplets. According to this method, nozzle information is obtained by observing and capturing an image of a droplet that lands on the landing observation discharge object in the landing observation step, missing discharge as a discharge defect, as well as landing position deviation and the landing diameter that fluctuates due to discharge abnormality can be more reliably monitored.

The landing observation discharge object is preferably a recording paper. According to this configuration, the use of recording paper reduces the effects of interfacial tension and the like of the surface on which the droplets are landed, and makes it possible to more reliably obtain information relating to the landing diameter or landing position deviation.

The liquid material drawing method preferably further comprises an observation step for observing the substrate discharged and drawn by the drawing step, a defective nozzle identifying step for identifying a defective nozzle from nozzles that coincide with the pixel region that has the pixel formation element when a defective pixel formation element is detected by the observation step, and a nozzle information updating step for updating the nozzle information based on information of the identified defective nozzle. Due to the usage frequency of the nozzles, the service life, and other factors, the discharge characteristics of the plurality of nozzles are not necessarily always constant. According to this method, the liquid material that is discharged and drawn for each pixel region of the substrate is observed in the observation step. A defective nozzle in which a discharge defect occurs is identified in the defective nozzle identifying step, and the nozzle information is updated in the nozzle information updating step based on the information of the defective nozzle. Accordingly, second arrangement information in which the first arrangement information is corrected based on the newest nozzle information can be generated in the arrangement information generation step. Specifically, a liquid material drawing method can be provided in which a stable discharge state is obtained.

The color filter manufacturing method of another aspect of the present invention is a method for manufacturing a color filter having at least three colors of color layers in a plurality of pixel regions that is formed in partitioned fashion on a substrate; and the color filter manufacturing method is characterized in comprising a drawing step for using the liquid material drawing method of one aspect of the present invention to discharge and draw at least three colors of a liquid material that includes a color layer formation material in the plurality of pixel regions, and a curing step for curing the discharged and drawn liquid material to form at least three colors of the color layers.

According to this method, since the abovementioned liquid material drawing method of one aspect of the present invention is used that is capable of reducing discharge defects, the necessary quantity of the liquid material is provided in the colored regions in the drawing step, and color layers having a substantially constant film thickness after drying are obtained in the curing step. Specifically, a color filter can be manufactured that has the desired optical characteristics and minimal color irregularity or color mixing due to discharge defects.

The organic EL element manufacturing method of another aspect of the present invention is a method for manufacturing an organic EL element having at least a luminescent layer in a plurality of pixel regions that is formed in partitioned fashion on a substrate; and the organic EL manufacturing method is characterized in comprising a drawing step for using the liquid material drawing method of one aspect of the present invention to discharge and draw a liquid material that includes a luminescent layer formation material in the plurality of pixel regions, and a curing step for curing the discharged and drawn liquid material to form the luminescent layer.

According to this method, since the liquid material drawing method of one aspect of the present invention capable of reducing discharge defects is used, the required amount of the liquid material is applied in the luminescent layer formation region in the drawing step, and a luminescent layer having a substantially constant film thickness after drying is obtained in the curing step. Specifically, an organic EL element can be manufactured that has minimal irregularities in luminescence or luminance due to discharge defects.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 1 is a schematic diagram showing the structure of the drawing system;

FIG. 4 is a schematic plan view showing the arrangement of the droplet discharge heads in the head unit;

FIG. 7 is a diagram showing the control signals for discharge control;

FIG. 12 is a table showing an example of the nozzle information;

FIG. 14A is a table showing the first arrangement information; FIG. 14B is a table showing the nozzle list; and FIG. 14C is a table showing the corrected second arrangement information;

FIG. 16 is a schematic diagram showing the method for observing the motherboard;

DETAILED DESCRIPTION OF EXEMPLARY EMBODIMENTS

First Embodiment

Figure 2:
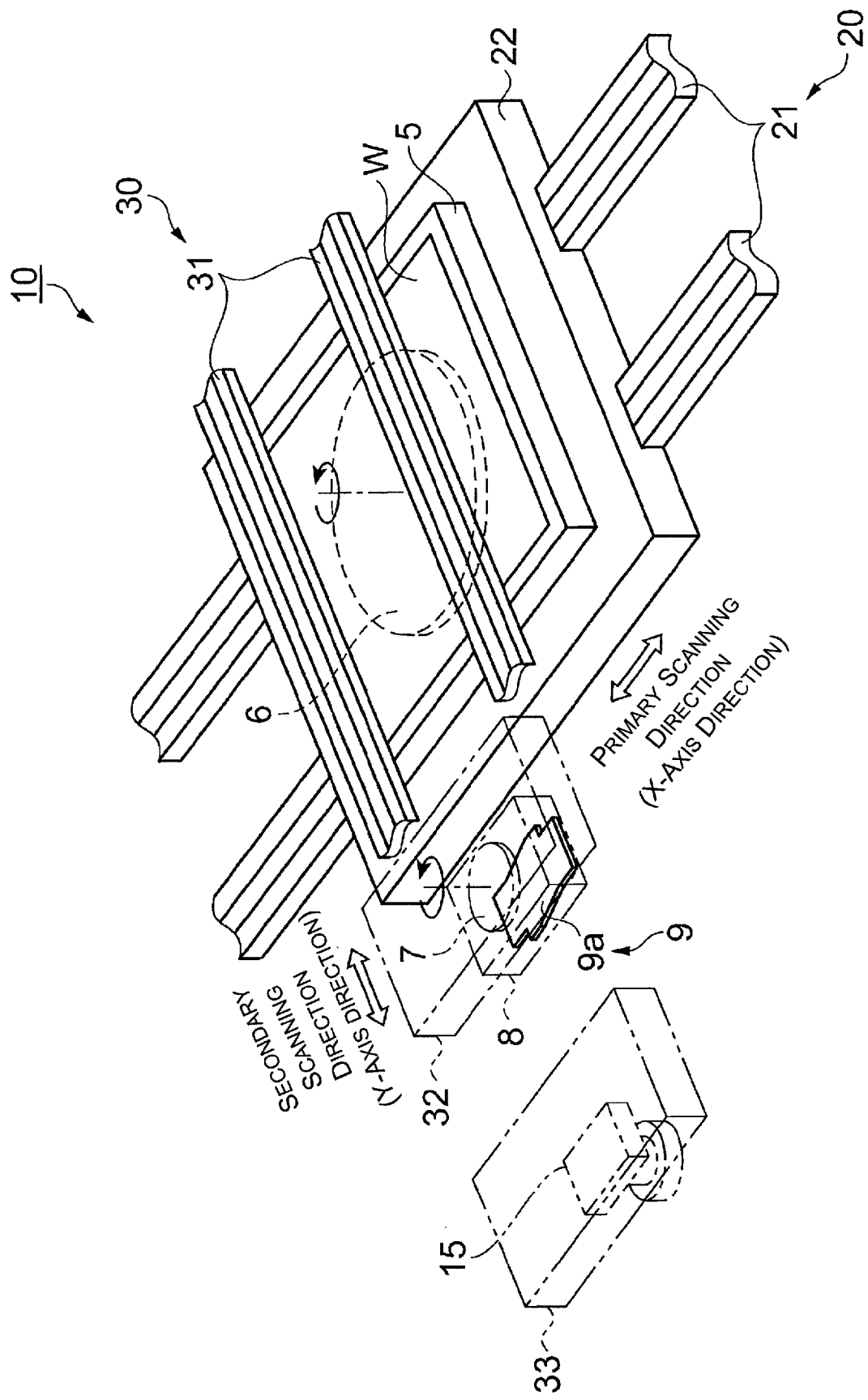
FIG. 2 is a schematic perspective view showing the structure of the droplet discharge device.

An embodiment of the present invention will be described using as an example a method for manufacturing a color filter having colored layers in a plurality of colors in color regions as a plurality of pixel regions on a substrate. The color layers are pixel formation elements that are formed by discharging and drawing droplets of a liquid material that includes a color layer forming material as a functional material from a plurality of nozzles to a plurality of pixel regions. A drawing system such as the one described below is used to discharge and draw the droplets of the liquid material.

Drawing System

FIG. 1 is a schematic view showing the structure of the drawing system. As shown in FIG. 1, the drawing system 1 of the present embodiment is provided with a droplet discharge device 10 for discharging droplets of the liquid material, and an upper-level computer 11 for performing overall control of the droplet discharge device 10.

A display unit 13 capable of displaying control information, a memory unit 14 for storing the control information, and a keyboard or other input unit 12 for inputting control data, a control program for controlling the droplet discharge device 10, or other control information are connected to the upper-level computer 11. The memory unit 14 may be a hard disk or other storage device or memory that is housed within the upper-level computer 11, or the memory unit 14 may be an external server.

The upper-level computer 11 is capable not only of transmitting the control program, control data, or other control information to the droplet discharge device 10, but also of modifying the control information. Nozzle information indicating the discharge state of each nozzle, and first arrangement information indicating the arrangement of nozzles that coincide with each pixel region during discharging and drawing of the liquid material are stored in the memory unit 14. The upper-level computer 11 has the function of an arrangement information generation unit for referencing the nozzle information and generating second arrangement information in which the first arrangement information is corrected according to the discharge characteristics of a nozzle when a nozzle is present in which a discharge defect occurs. The upper-level computer 11 also has the function of a nozzle information generation unit for generating nozzle information. A detailed description will be given in the description of the liquid material drawing method hereinafter.

The droplet discharge device 10 will next be described based on FIGS. 2 through 7. FIG. 2 is a schematic perspective view showing the structure of the droplet discharge device.

As shown in FIG. 2, the droplet discharge device 10 is provided with a workpiece movement mechanism 20 for moving a motherboard W as a workpiece in a primary scanning direction (X-axis direction), and a head movement mechanism 30 for moving a droplet discharge head 50 (see FIG. 3) in a secondary scanning direction (Y-axis direction).

The workpiece movement mechanism 20 is provided with a pair of guide rails 21, a movement stage 22 that moves along the pair of guide rails 21, and a setting table 5 for mounting the motherboard W that is attached via a θ table 6 as a rotation mechanism on the movement stage 22. The movement stage 22 is moved in the primary scanning direction through the use of an air slider and a linear motor (not shown) provided inside the guide rails 21. The setting table 5 is configured so as to be capable of attaching and fixing the motherboard W, and a reference axis in the motherboard W can be properly aligned with the primary scanning direction and the secondary scanning direction through the use of the θ table 6.

The head movement mechanism 30 is provided with a pair of guide rails 31, and two movement stages 32, 33 that move along the pair of guide rails 31. The movement stage 32 is provided with a carriage 8 that is attached by suspension via a rotation mechanism 7. The carriage 8 is provided with a head unit 9 in which a plurality of droplet discharge heads 50 is mounted. A liquid material feeding mechanism (not shown) for supplying the liquid material to the droplet discharge heads 50, and a head driver 48 (see FIG. 5) for electrically controlling the driving of the plurality of droplet discharge heads 50 are also provided. The movement stage 32 moves the carriage 8 in the Y-axis direction so that the head unit 9 is positioned facing the motherboard W.

A camera 15 as an imaging mechanism is mounted on the movement stage 33. The camera 15 is capable of moving in the Y-axis direction through the use of the movement stage 33 so as to observe and image the landing state of the landed droplets on the surface of the motherboard W. An illumination device for illuminating the imaged body may be provided to the movement stage 33 as needed.

Besides the structures described above, a maintenance mechanism for eliminating nozzle obstructions in the plurality of droplet discharge heads 50 mounted in the head unit 9, removing debris or contamination from the nozzle surfaces, and performing other maintenance is provided to the droplet discharge device 10 in a position facing the plurality of droplet discharge heads 50, but is not shown in the drawings.

Figure 3A:
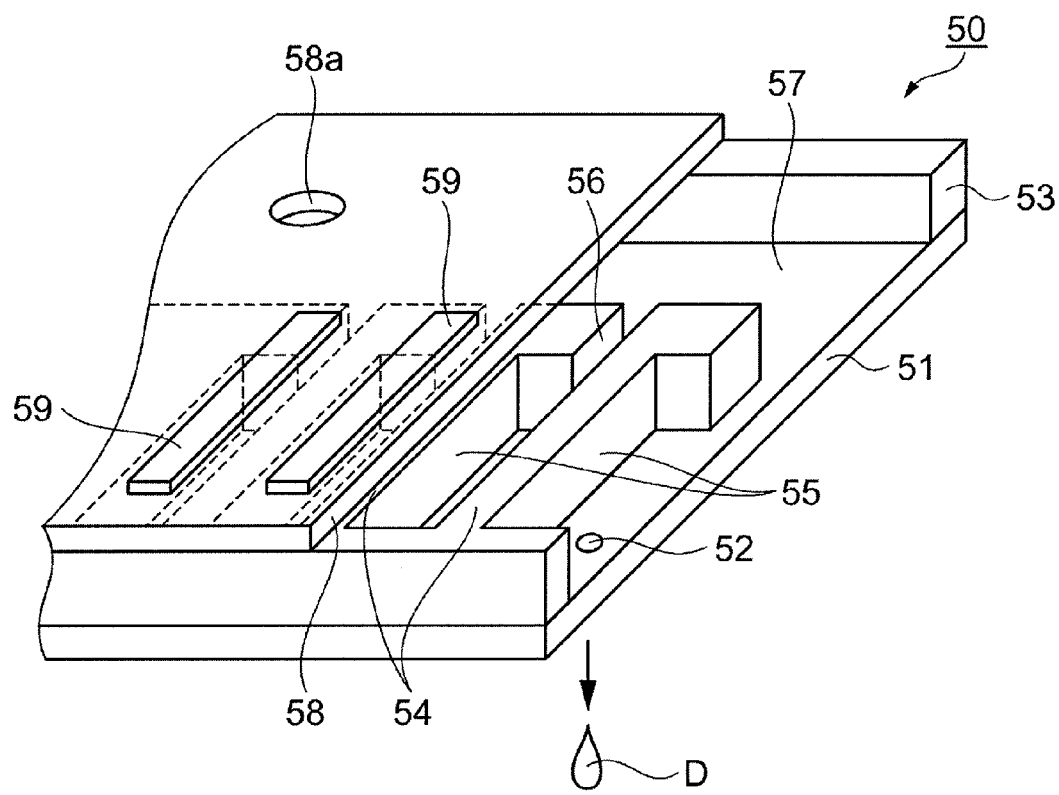
FIGS. 3A and 3B are schematic diagrams showing the structure of a droplet discharge head.
Figure 3B:
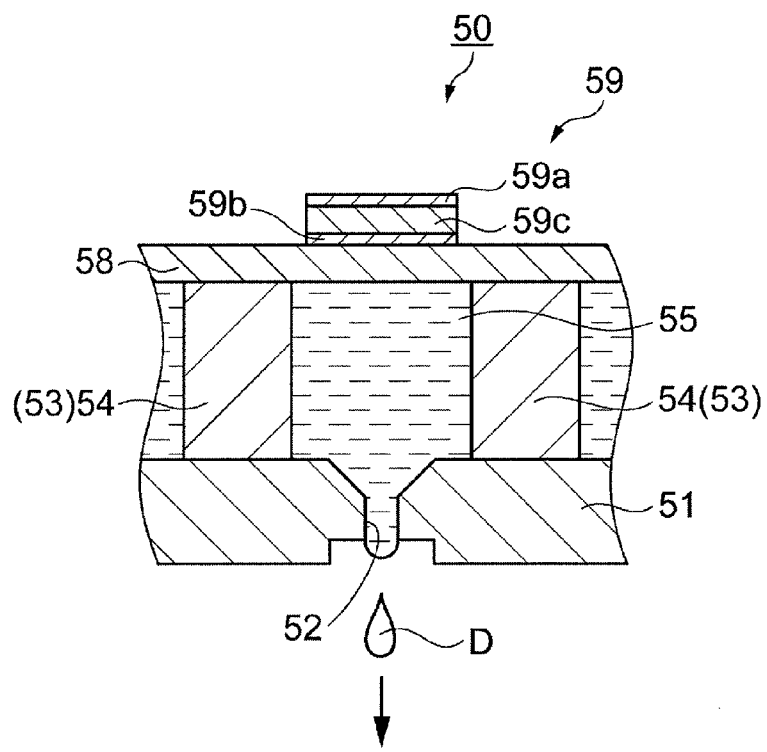

FIG. 3 is a schematic view showing the structure of the droplet discharge heads. FIG. 3A is a schematic exploded perspective view, and FIG. 3B is a sectional view showing the structure of the nozzle part. As shown in FIGS. 3A and 3B, the droplet discharge heads 50 have a structure in which a nozzle plate 51 having a plurality of nozzles 52 from which droplets D are discharged; a cavity plate 53 having barriers 54 for partitioning cavities 55 with which the plurality of nozzles 52 communicates; and an oscillation plate 58 having transducers 59 as energy generation unit that correspond to the cavities 55 are layered in sequence and joined together.

The cavity plate 53 has the barriers 54 for partitioning the cavities 55 with which the nozzles 52 communicate, and has channels 56, 57 for filling the liquid material into the cavities 55. The channel 57 is between the nozzle plate 51 and the oscillation plate 58, and the space thus formed serves as a reservoir in which the liquid material is stored.

The liquid material is fed through a conduit from the liquid material feeding mechanism and through a feeding hole 58a provided to the oscillation plate 58, and is stored in the reservoir. The liquid material is then filled into the cavities 55 through the channels 56.

As shown in FIG. 3B, the transducers 59 are piezoelectric elements composed of a piezo element 59c and a pair of electrodes 59a, 59b that sandwich the piezo element 59c. A drive voltage pulse is applied to the pair of electrodes 59a, 59b from the outside, whereby the bonded oscillation plate 58 is caused to change shape. The volume of the cavities 55 divided by the barriers 54 thereby increases, and the liquid material is drawn into the cavities 55 from the reservoir. When application of the drive voltage pulse is ended, the oscillation plate 58 returns to the original state and presses on the filled liquid material. This structure thereby enables the liquid material to be discharged as droplets D from the nozzles 52. The discharging of the liquid material can be controlled for each of the nozzles 52 by controlling the drive voltage pulse that is applied to the piezo element 59c.

The droplet discharge heads 50 are not limited to being provided with piezoelectric elements (piezo elements). The droplet discharge heads 50 may be provided with an electromechanical conversion element for displacing the oscillation plate 58 through electrostatic adsorption, or an electrothermal conversion element for heating the liquid material and discharging the liquid material from the nozzles 52 as droplets D.

FIG. 4 is a schematic plan view showing the arrangement of the droplet discharge heads in the head unit. FIG. 4 is specifically a view from the side facing the setting table 5.

As shown in FIG. 4, the head unit 9 is provided with a head plate 9a in which the plurality of droplet discharge heads 50 is arranged. A total of six droplet discharge heads 50 that include a head group 50A composed of three droplet discharge heads 50, and a head group 50B composed of three droplet discharge heads 50 are mounted in the head plate 9a. In this case, the head R1 (droplet discharge head 50) of the head group 50A, and the head R2 (droplet discharge head 50) of the head group 50B discharge the same type of liquid material. The same configuration applies for the other heads G1 and G2, and B1 and B2. Specifically, a configuration is adopted in which three different types of liquid material can be discharged.

Each droplet discharge head 50 has a nozzle row 52a composed of a plurality (180) of nozzles 52 that is arranged at substantially equal intervals (a nozzle pitch of approximately 140 μm). The diameter of the nozzles 52 is approximately 20 μm. The draw width that can be drawn by a single droplet discharge head 50 is designated as $L_0$, which is the effective length of the nozzle row 52a. A nozzle row 52a is assumed hereinafter to be composed of 180 nozzles 52.

In this case, head R1 and head R2 are arranged in the primary scanning direction so that nozzle rows 52a (nozzle row 1A and nozzle row 1B) that are adjacent to each other as viewed from the primary scanning direction (X-axis direction) are continuous at a pitch of one nozzle in the secondary scanning direction (Y-axis direction) that is orthogonal to the primary scanning direction. Accordingly, the effective draw width $L_1$ of head R1 and head R2 that discharge the same type of liquid material is twice the draw width $L_0$. The same arrangement in the primary scanning direction is adopted in heads G1 and G2, and heads B1 and B2.

The nozzle rows 52a provided to the droplet discharge heads 50 are not limited to single rows. For example, when a plurality of nozzle rows 52a is offset with respect to each other, the effective nozzle pitch decreases, and the droplets D can be discharged with high resolution.

Figure 5:
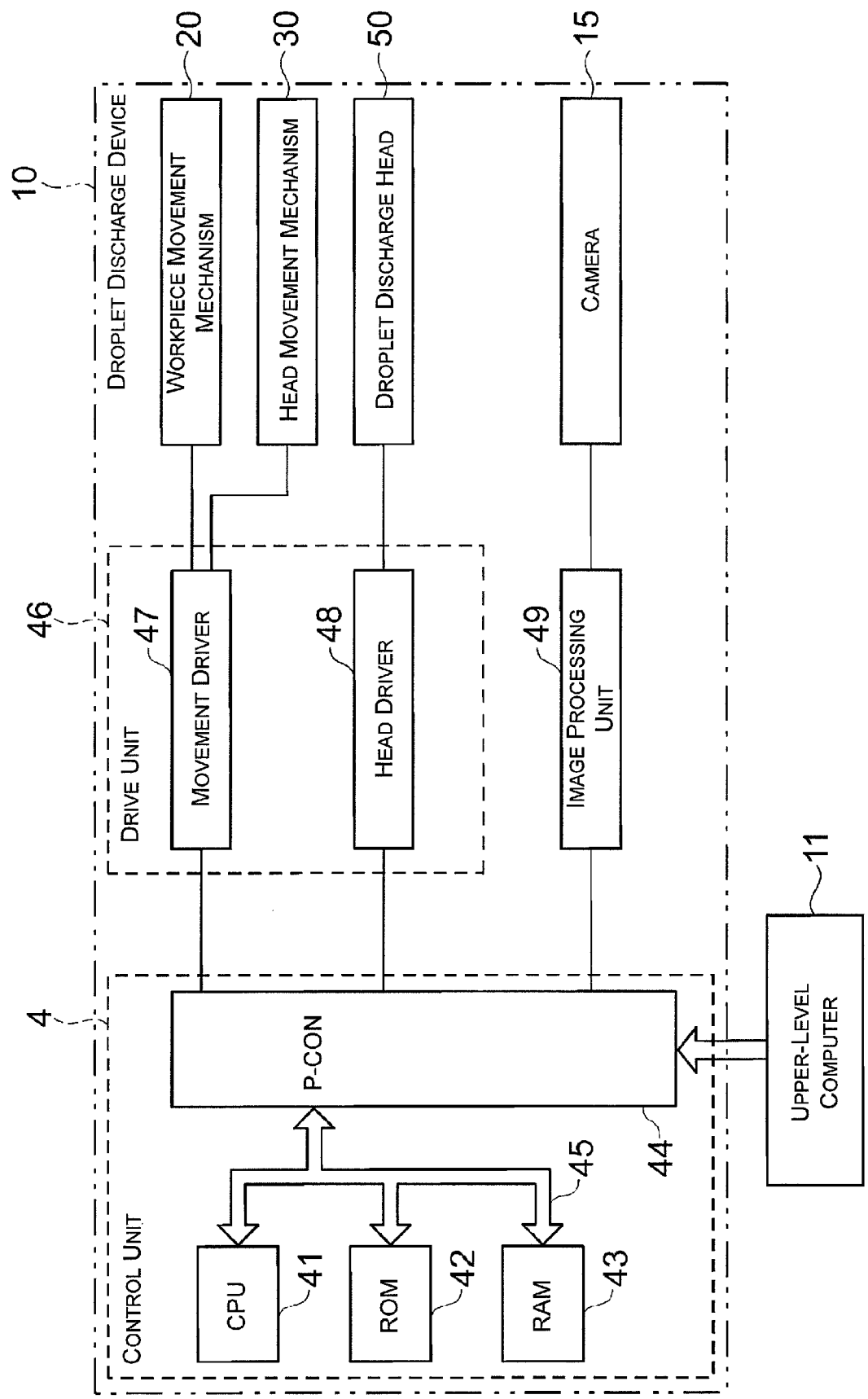
FIG. 5 is a block diagram showing the control system of the droplet discharge device.

The control system of the droplet discharge device 10 will next be described. FIG. 5 is a block diagram showing the control system of the droplet discharge device. The control system of the droplet discharge device 10 is provided with a drive unit 46 having various types of drivers for driving the droplet discharge heads 50, the workpiece movement mechanism 20, the head movement mechanism 30, and other components; and a control unit 4 for controlling the droplet discharge device 10 as well as the drive unit 46. The control system is also provided with an image processing unit 49 to which the camera 15 is connected.

The drive unit 46 is provided with a movement driver 47 for performing drive control of the linear monitors of the workpiece movement mechanism 20 and the head movement mechanism 30, respectively; a head driver 48 for performing discharge control of the droplet discharge heads 50; and a maintenance driver (not shown) for performing drive control of the maintenance units of the maintenance mechanism.

The control unit 4 is provided with a CPU 41, ROM 42, RAM 43, and a P-CON 44 that are connected to each other via a bus 45. The upper-level computer 11 is connected to the P-CON 44. The ROM 42 has a control program region for storing a control program or the like proceed by the CPU 41, and a control data region for storing control data and the like for performing drawing operations, function-restoring processing, and the like.

The RAM 43 has a draw data storage part for storing draw data for drawing on the motherboard W, a position data storage part for storing position data of the motherboard W and the droplet discharge heads 50 (actually, the nozzle rows 52a), and various other storage parts, and is used as a region for various types of operations for control processing. The image processing unit 49 and the various drivers and the like of the drive unit 46 are connected to the P-CON 44, and a logical circuit for assisting in the functions of the CPU 41 and handling interface signals with peripheral circuits is formed and incorporated in the P-CON 44. The P-CON 44 therefore inputs various types of commands and the like from the upper-level computer 11 to the bus 45 with or without modification, and outputs the data or control signal outputted from the CPU 41 and other components to the bus 45 to the drive unit 46 with or without modification in conjunction with the CPU 41.

The CPU 41 controls the droplet discharge device 10 as a whole by inputting various types of detection signals, various types of commands, various types of data, and the like via the P-CON 44, and processing the various types of data and the like in the RAM 43, and then outputting various types of control signals to the drive unit 46 and other components via the P-CON 44 in accordance with a control program in the ROM 42. For example, the CPU 41 controls the droplet discharge heads 50, the workpiece movement mechanism 20, and the head movement mechanism 30, positions the droplet discharge heads 50 and the motherboard W so as to face each other, and performs discharge and drawing of the droplets D of the liquid material on the motherboard W from the plurality of nozzles 52 of the droplet discharge heads 50 in synchronization with the relative movement of the droplet discharge heads 50 and the motherboard W. In this case, discharging of the liquid material in synchronization with movement of the motherboard W in the X-axis direction is referred to as primary scanning, and movement of the head unit 9 in which the plurality of droplet discharge heads 50 is mounted in the Y-axis direction is referred to as secondary scanning. The droplet discharge device 10 of the present embodiment can discharge and draw the liquid material through multiple repetitions of a combination of primary scanning and secondary scanning. Primary scanning is not limited to movement of the motherboard W in one direction with respect to the droplet discharge heads 50, and the motherboard W may also be moved back and forth.

The CPU 41 drives the head movement mechanism 30 so that the movement stage 33 is moved in the Y-axis direction, and the mounted camera 15 is positioned facing the motherboard W. The state of the droplets D landed on the surface of the motherboard W is observed and imaged. Position information whereby the camera 15 is moved with respect to the motherboard W for observation is generated by the upper-level computer 11 and inputted in advance as observation coordinates to the RAM 43. The image processing unit 49 is connected to the upper-level computer 11 via the P-CON 44. The upper-level computer 11 can display the image information captured by the camera 15 and converted by the image processing unit 49 in the display unit 13, and an operator can confirm the landing state of the droplets D.

The image processing unit 49 converts the imaged landing state of the droplets D to bitmap data. The CPU 41 can compute the landing diameter and the amount of landing position deviation of the droplets D from the bitmap data. The computed results are written to the RAM 43, and are substantially simultaneously transmitted as nozzle information to the upper-level computer 11 and stored in the memory unit 14. Image confirmation and storage in the form of nozzle information in the memory unit 14 are performed in the same manner when clogging occurs in a nozzle 52, and the droplets D are not discharged. Details of this process will be described in the liquid material drawing method hereinafter.

Figure 6:
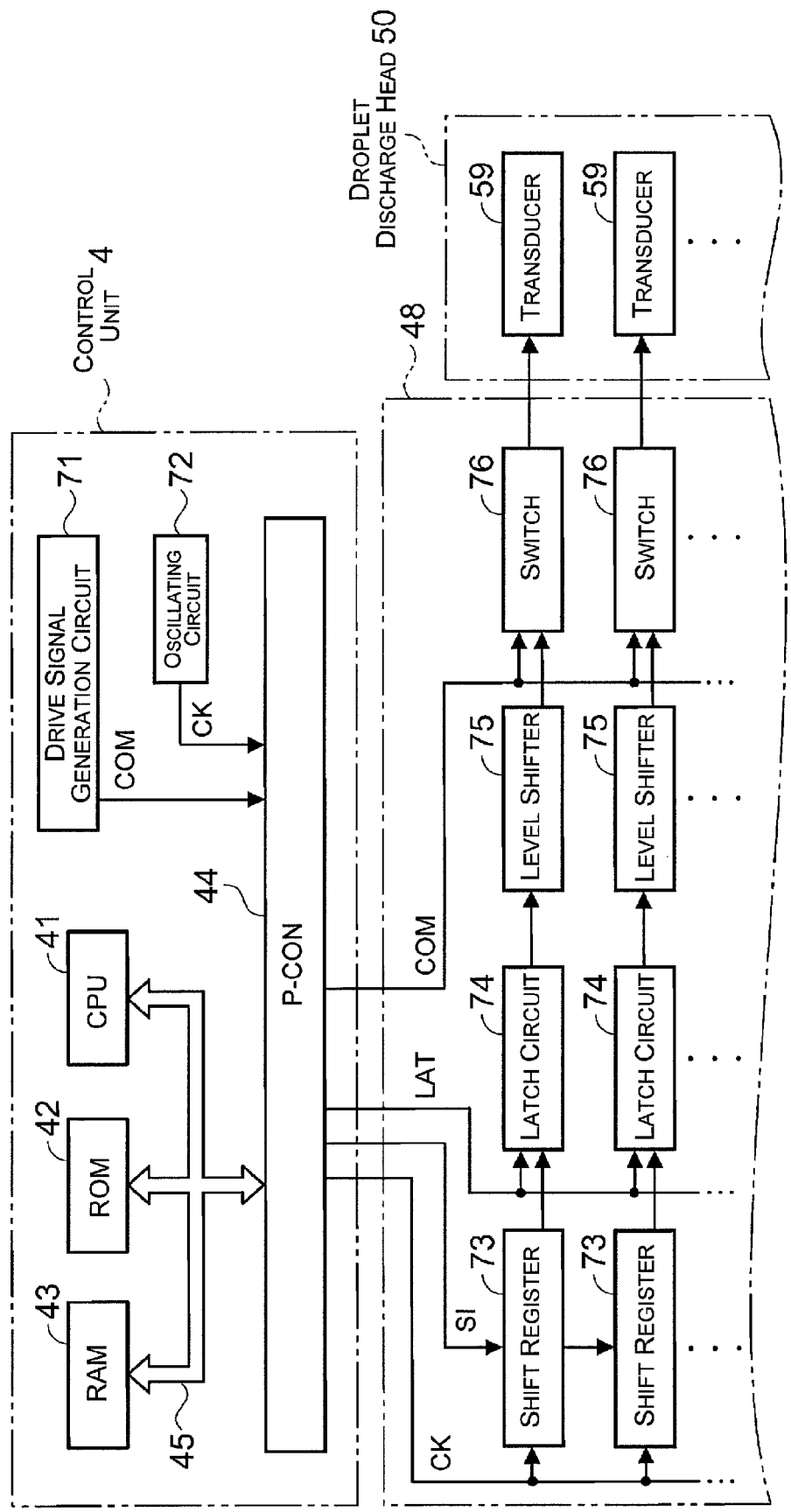
FIG. 6 is a block diagram showing the details of discharge control.

The method for controlling discharge in the droplet discharge heads will next be described with reference to FIGS. 6 and 7. FIG. 6 is a block diagram showing the details of discharge control. As shown in FIG. 6, the control unit 4 is provided with the CPU 41, the ROM 42, the RAM 43, the P-CON 44, and the bus 45, as well as with a drive signal generation circuit 71 for generating a drive signal (COM), and an oscillating circuit 72 for generating a clock signal (CK). The head driver 48 is provided with shift registers 73, latch circuits 74, level shifters 75, and switches 76, and is configured so as to be capable of selectively applying the drive signal (COM) to the transducers 59 that correspond to the nozzles 52 of the droplet discharge heads 50.

The upper-level computer 11 transmits control data in which the positions of the droplets D in the drawing object are indicated as position information (including first arrangement information and second arrangement information) of the nozzles 52 to the control unit 4. The arrangement information includes the relative discharge positions of the plurality of nozzles 52 with respect to the motherboard W, the selection of nozzles 52 for discharge of droplets D, the number of discharges of droplets D, and the drive conditions when the droplets D are discharged. The control unit 4 generates a nozzle data signal (SI) or a drive signal (COM) for each nozzle row unit in the following manner based on the items of control data.

Specifically, the CPU 41 decodes the control data and generates nozzle data that include ON/OFF information for each nozzle. The drive signal generation circuit 71 performs setting and generation of the drive signal (COM) based on the nozzle data computed by the CPU 41.

The nozzle data signal (SI) in which the nozzle data are converted to a serial signal is synchronized with the clock signal (CK) and transmitted to the shift registers 73, and the ON/OFF information of each of the nozzles 52 is stored. A latch signal (LAT) generated by the CPU 41 is inputted to the latch circuits 74, whereby the nozzle data are latched. The latched nozzle data are amplified by the level shifters 75, and a prescribed voltage is fed to the switches 76 when the nozzle data indicate "ON." When the nozzle data indicate "OFF," a voltage is not fed to the switches 76.

While the voltage increased by the level shifters 75 is being fed to the switches 76, the drive signal (COM) is applied to the transducers 59, and droplets D are discharged from the nozzles 52 (see FIG. 3).

Such discharge control is performed periodically as shown in FIG. 7 in synchronization with the relative movement (primary scanning) of the head unit 9 and the motherboard W.

FIG. 7 is a diagram showing the control signals for discharge control. In the drive signal (COM) as shown in FIG. 7, a sequence of pulse groups 200-1, 200-2, . . . that have an electrical discharge pulse 201, a charging pulse 202, and an electrical discharge pulse 203 are connected by an intermediate potential 204. A single droplet D is discharged by a single pulse group in the manner described below.

Specifically, the potential level is increased, and the liquid material is drawn into the cavities 55 (see FIG. 3B) by the electrical discharge pulse 201. The liquid material inside the cavities 55 is then rapidly pressurized and expelled in the form of droplets (discharge) from the nozzles 52 by the sharp charging pulse 202. Lastly, the reduced potential level is returned to the intermediate potential 204 by the electrical discharge pulse 203, and the pressure oscillation (natural oscillation) generated inside the cavities 55 by the charging pulse 202 is cancelled.

The voltage components Vc, Vh, the time component (pulse slope, connection gap between pulses, and the like), and the like in the drive signal (COM) are parameters that have a significant bearing on the discharged amount, the discharge stability, and other factors, and these parameters require appropriate advance design. In this case, the period of the latch signal (LAT) is set to 20 kHz with consideration for the specific frequency characteristics of the droplet discharge heads 50. The speed (in this case, the movement speed of the setting table 5 in the X-axis direction) of relative movement of the droplet discharge heads 50 and the substrate W during primary scanning is set to 200 mm/second. Accordingly, when the discharge resolution is calculated by dividing the relative movement speed by the latch period, the unit of discharge resolution is 10 µm. Specifically, the discharge timing can be set for each nozzle 52 in units of discharge resolution. In other words, the droplets D can be arranged at a discharge interval in units of 10 µm on the surface of the motherboard W. When the timing at which the latch pulse is generated is based on a pulse that is outputted by an encoder (not shown) provided to the movement stage 22, the discharge timing can also be controlled in units of movement resolution.

The droplet discharge device 10 makes it possible for the liquid material to be discharged as droplets D with varying discharge amounts and discharge timings by each nozzle 52 of the droplet discharge heads 50. Accordingly, when there is a nozzle 52 in which flight deflection occurs, for example, that is not restored by maintenance of the droplet discharge heads 50 by the maintenance mechanism, deviation of the landing position due to flight deflection can be corrected by changing the method of discharge control for the affected nozzle 52.

When a nozzle 52 in which landing position deviation, discharge abnormality, or missing discharge due to obstruction occurs in the discharge characteristics in the nozzle information, the upper-level computer 11 can generate second arrangement information in which the first arrangement information is corrected so that defective nozzles in which these discharge defects occur are not selected, and other normal nozzles are selected to discharge the liquid material.

Consequently, such a drawing system 1 is capable of placing the head unit 9 opposite the motherboard W through the use of the head movement mechanism 30, and discharging the necessary amount of the liquid material in the form of droplets D with high positional accuracy from the total of six droplet discharge heads 50 that are provided to the head unit 9, in synchronization with primary scanning by the workpiece movement mechanism 20.

Figure 8:
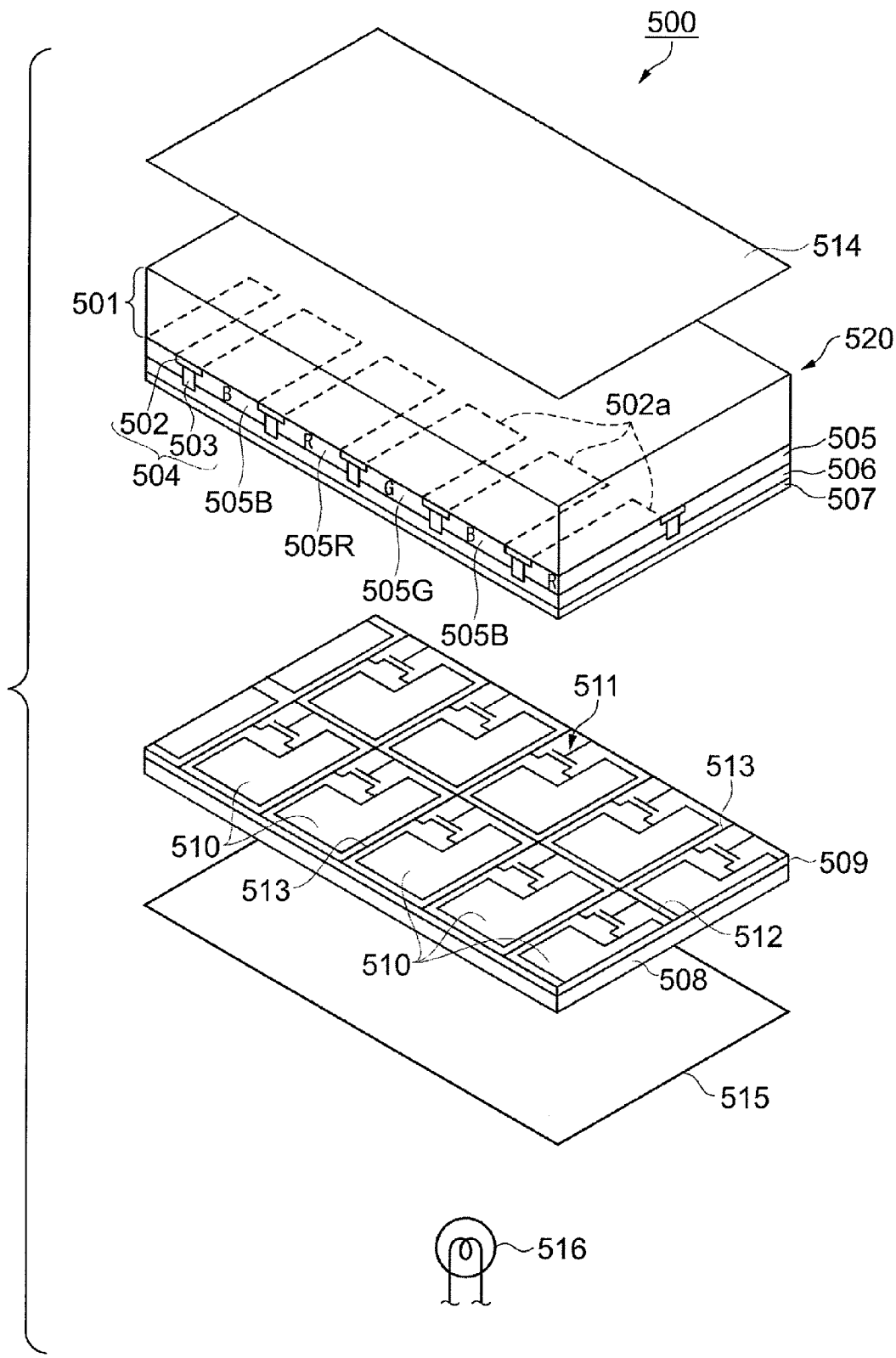
FIG. 8 is a schematic exploded perspective view showing the structure of the liquid crystal display device.

The color filter manufacturing method that uses the drawing system 1 of the present embodiment will next be described. The liquid crystal display device as an electro-optical device having a color filter will first be briefly described. FIG. 8 is a schematic exploded perspective view showing the structure of the liquid crystal display device.

As shown in FIG. 8, the liquid crystal display device 500 is provided with a TFT (Thin Film Transistor) transmissive liquid crystal display panel 520 and an illumination device 516 for illuminating the liquid crystal display panel 520. The liquid crystal display panel 520 is provided with an opposing substrate 501 having color filters 505 that have a color layer; an element substrate 508 having TFT elements 511 in which one of three terminals is connected to a pixel electrode 510; and liquid crystals (not shown) that are held between the opposing substrate 501 and the element substrate 508. An upper polarizer 514 and a lower polarizer 515 for polarizing the transmitted light are provided to the surfaces of the opposing substrate 501 and the element substrate 508 that form the outside of the liquid crystal display panel 520.

The opposing substrate 501 is composed of transparent glass or another material, and is provided with banks 504 as barrier parts for partitioning the color regions as a plurality of pixel regions into a matrix on the surfaces that sandwich the liquid crystal, and three colors (RGB) of color layers 505R, 505G, 505B in the plurality of partitioned color regions. The banks 504 are composed of lower-layer banks 502 referred to as a black matrix that are composed of Cr or another metal or oxide film thereof that has light-blocking properties, and upper-layer banks 503 composed of an organic compound that are formed on (downward in the drawing) the lower-layer banks 502. The opposing substrate 501 is provided with an overcoat layer (OC layer) 506 as a planarizing layer for covering the color layers 505R, 505G, 505B that are partitioned by the bank 504 and the bank 504; and an opposing electrode 507 composed of ITO (Indium Tin Oxide) or another transparent conductive film that is formed so as to cover the OC layer 506. The color filters 505 are manufactured using the color filter manufacturing method described hereinafter.

The element substrate 508 is also composed of a glass or other transparent material, and has pixel electrodes 510 formed in a matrix via an insulation film 509 on the side on which the liquid crystals are sandwiched, and a plurality of TFT elements 511 formed so as to correspond to the pixel electrodes 510. Of the three terminals of the TFT elements 511, the other two terminals that are not connected to the pixel electrodes 510 are connected to scanning lines 512 and data lines 513 that are arranged in a lattice so as to surround and insulate the pixel electrodes 510 from each other.

The illumination device 516 may be any illumination device that uses a white LED, EL, cold cathode tube, or the like as a light source, and that has a structure provided with a light-guide plate, a diffusion plate, a reflection plate, or the like that is capable of emitting the light from the light source to the liquid crystal display panel 520.

Orientation films for aligning the liquid crystal molecules in one direction are formed on the surfaces of the opposing substrate 501 and the element substrate 508 that sandwich the liquid crystal, but the orientation films are not shown in the drawing. The upper and lower polarizers 514, 515 may also have phase difference films or other optically functional films that are used for such purposes as improving the viewing angle dependency. The liquid crystal display panel 520 is not limited to having TFT elements as the active elements, and may have a TFD (Thin Film Diode) element. When the liquid crystal display panel 520 is provided with a color filter on at least one of the substrates, the liquid crystal display panel 520 may be a passive liquid crystal display device in which the electrodes constituting the pixels are arranged so as to intersect each other.

The abovementioned liquid crystal display device 500 is manufactured by a process in which a structure formed by bonding the motherboard W in which the opposing substrate 501 provided with color filters 505 that has a plurality of partitions formed in a matrix therein with a motherboard in which the element substrate 508 has a plurality of partitions formed in a matrix therein in the same manner so as to sandwich the liquid crystal, and cutting the assembly in a prescribed position to obtain the liquid crystal display device.

Color Filter Manufacturing Method

FIGS. 9A through 9E are schematic sectional views showing the color filter manufacturing process. The method for manufacturing the color filters 505 having three colors of color layers 505R, 505G, 505B such as described above is provided with a step for forming banks 504 on the surface of the opposing substrate 501, and a step for treating the surfaces of the color regions A that are partitioned by the banks 504. The manufacturing method is also provided with a drawing step for discharging droplets D of three types (three colors) of the liquid material that includes a color layer forming material in the surface-treated color regions A using the drawing system 1, and a film formation step as a curing step for drying the drawn liquid material to form color layers 505R, 505G, 505B. The manufacturing method is furthermore provided with a step for forming the OC layer 506 so as to cover the banks 504 and the color layers 505R, 505G, 505B, and a step for forming the transparent opposing electrode 507 that is composed of ITO so as to cover the OC layer 506.

Figure 9A:
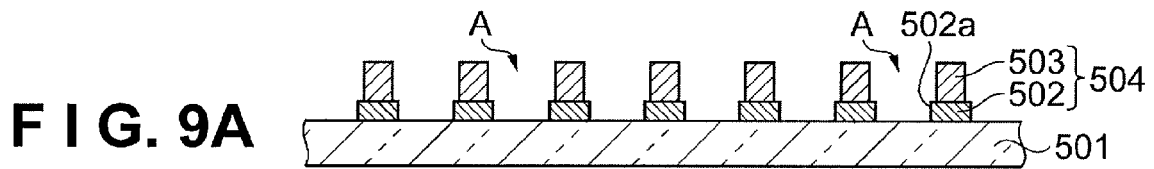
FIGS. 9A through 9E are schematic sectional views showing the color filter manufacturing method.

In the step for forming the banks 504, the lower-layer banks 502 as the black matrix are first formed on the opposing substrate 501, as shown in FIG. 9A. The material used to form the lower-layer banks 502 may be Cr, Ni, Al, or another non-transparent metal, or an oxide or other compound of these metals, for example. The lower-layer banks 502 are formed by a method in which a film composed of the abovementioned material is formed on the opposing substrate 501 using vapor deposition or sputtering. The film thickness may be set according to a material having an appointed film thickness that allows light-blocking properties to be maintained. For example, a thickness of 100 to 200 nm is preferred when the material is Cr. The film in areas other than the portions that correspond to the open parts 502a (see FIG. 8) is covered by a resist according to a photolithography method, and the film is etched using oxygen or another etching solution that corresponds to the abovementioned material. The lower-layer banks 502 having open parts 502a are thereby formed.

The upper-layer banks 503 are then formed on the lower-layer banks 502. An acrylic-based photosensitive resin material is used as the material for forming the upper-layer banks 503. The photosensitive resin material preferably has light-blocking properties. In an example of the method for forming the upper-layer banks 503, a photosensitive resin material is applied by roll coating or spin coating to the surface of the opposing substrate 501 on which the lower-layer banks 502 are formed, and the photosensitive resin material is dried to from a photosensitive resin layer having a thickness of about 2 μm. A mask provided with open parts that are sized according to the color regions A is then positioned opposite the opposing substrate 501 in a prescribed position, and exposure/development are performed to form the upper-layer banks 503. The banks 504 for partitioning the plurality of color regions A in a matrix are thereby formed on the opposing substrate 501. The process then proceeds to the surface treatment step.

In the surface treatment step, plasma treatment using $O_2$ as the treatment gas, and plasma treatment using a fluorine-based gas as the treatment gas are performed. Specifically, the color regions A are subjected to a lyophilizing treatment, and the surfaces of the upper-layer banks 503 (including the wall surfaces) composed of the photosensitive resin are then subjected to a fluid repellant treatment. The process then proceeds to the drawing step.

Figure 9B:
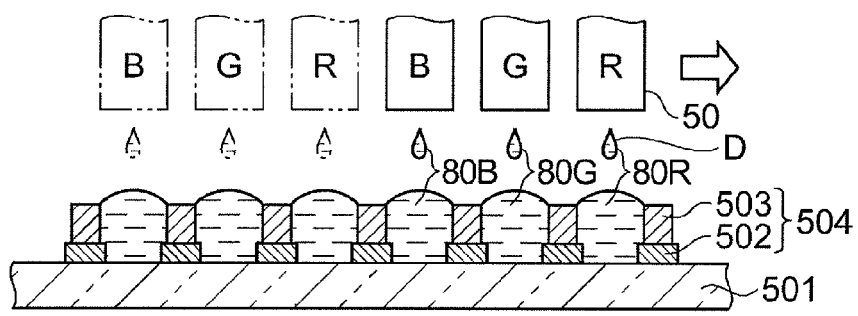

In the drawing step, droplets of the liquid material 80R, 80G, 80B in the corresponding colors for the surface-treated color regions A are discharged as shown in FIG. 9B. The liquid material 8OR includes R (red) color-filter-forming material, the liquid material 80G includes G (green) color-filter-forming material, and the liquid material 80B includes B (blue) color-filter-forming material. The liquid material 80R, 80G, 80B is filled into the droplet discharge heads 50 of the droplet discharge device 10. Primary scanning is then performed in which the head unit 9 and the motherboard W are moved relative to each other based on the arrangement information of the nozzles 52, and the liquid material 80R, 80G, 80B is discharged from the droplet discharge heads 50 to the color regions A. Since the liquid material 80R, 80G, 80B is discharged using the liquid material drawing method described hereinafter, the necessary quantity is provided according to the surface area of the color regions A.

Figure 9C:
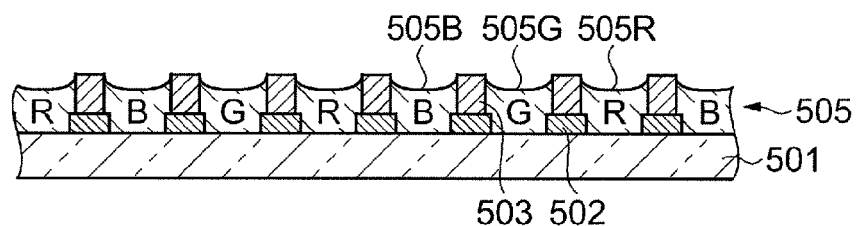

In the subsequent film formation step, the discharged and drawn liquid material 80R, 80G, 80B is dried at once to remove the solvent component, and films of the color layers 505R, 505G, 505B are formed, as shown in FIG. 9C. Vacuum drying or another method that is capable of uniformly drying the solvent components is preferred as the drying method. The process then proceeds to the OC layer formation step.

Figure 9D:
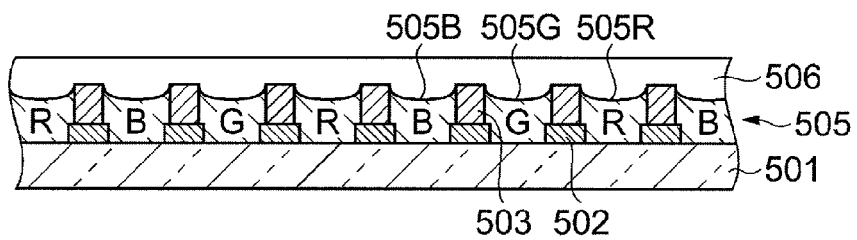

In the OC layer formation step, the OC layer 506 is formed so as to cover the upper-layer banks 503 and the color layers 505R, 505G, 505B, as shown in FIG. 9D. A transparent acrylic-based resin material may be used as the OC layer 506. Formation methods include spin coating, offset printing, and other methods. The OC layer 506 is provided to mitigate irregularities in the surface of the opposing substrate 501 on which the color layers 505R, 505G, 505B are formed, and to flatten the opposing electrode 507 that is subsequently formed as a film on the surface of the opposing substrate 501. A thin film of $SiO_2$ or the like may also be formed on the OC layer 506 to maintain adhesion with the opposing electrode 507. The process then proceeds to the transparent electrode formation step.

Figure 9E:
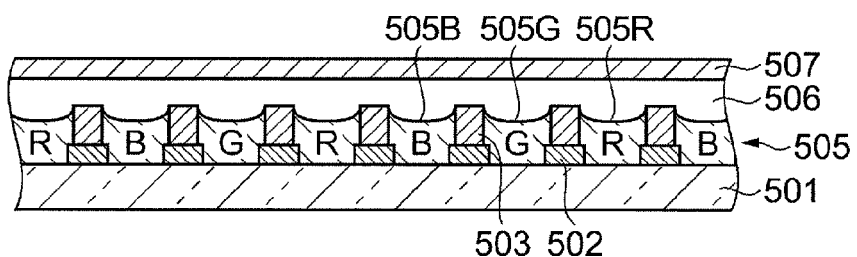

In the transparent electrode formation step, a film of ITO or another transparent electrode material is formed in a vacuum using sputtering or vapor deposition, and the opposing electrode 507 is formed on the entire surface so as to cover the OC layer 506, as shown in FIG. 9E.

In the abovementioned drawing step, the drawing system 1 is used to discharge and draw three different types of the liquid material 80R, 80G, 80B at substantially the same time. Stable discharge of the necessary quantity of the liquid material in the corresponding color region A is required in such a drawing method. For example, discharge irregularities occur in the color regions A when blockage of the nozzles 52 or fluctuation in the discharged quantity of droplets D occurs. When the droplets D discharged from the nozzles 52 do not land in the originally intended color region A due to flight deflection of the droplets D, and a different liquid material lands in the color region A, different types of the liquid material mix together, and so-called mixing occurs. These discharge defects affect the product yield during manufacture of the color filters 505. In the liquid crystal display device 500, pixels that have color layers 505R, 505G, 505B in which discharge irregularity or mixing occurs have irregular color and other pixel defects. The occurrence of these discharge defects is therefore prevented to the fullest extent possible.

In the head unit 9, two droplet discharge heads 50 into which the liquid material is filled are provided for each type (color) of the liquid material, and droplets D of the same type of liquid material are discharged from a total of 360 nozzles 52. The flow of the motherboard W is stopped, and productivity during manufacturing of the color filters 505 is difficult to enhance when maintenance of the droplet discharge heads 50 is performed by the maintenance mechanism each time a discharge defect occurs in the droplets D. The liquid material drawing method of the present invention was developed in view of such a problem.

Liquid Material Drawing Method

Figure 10:
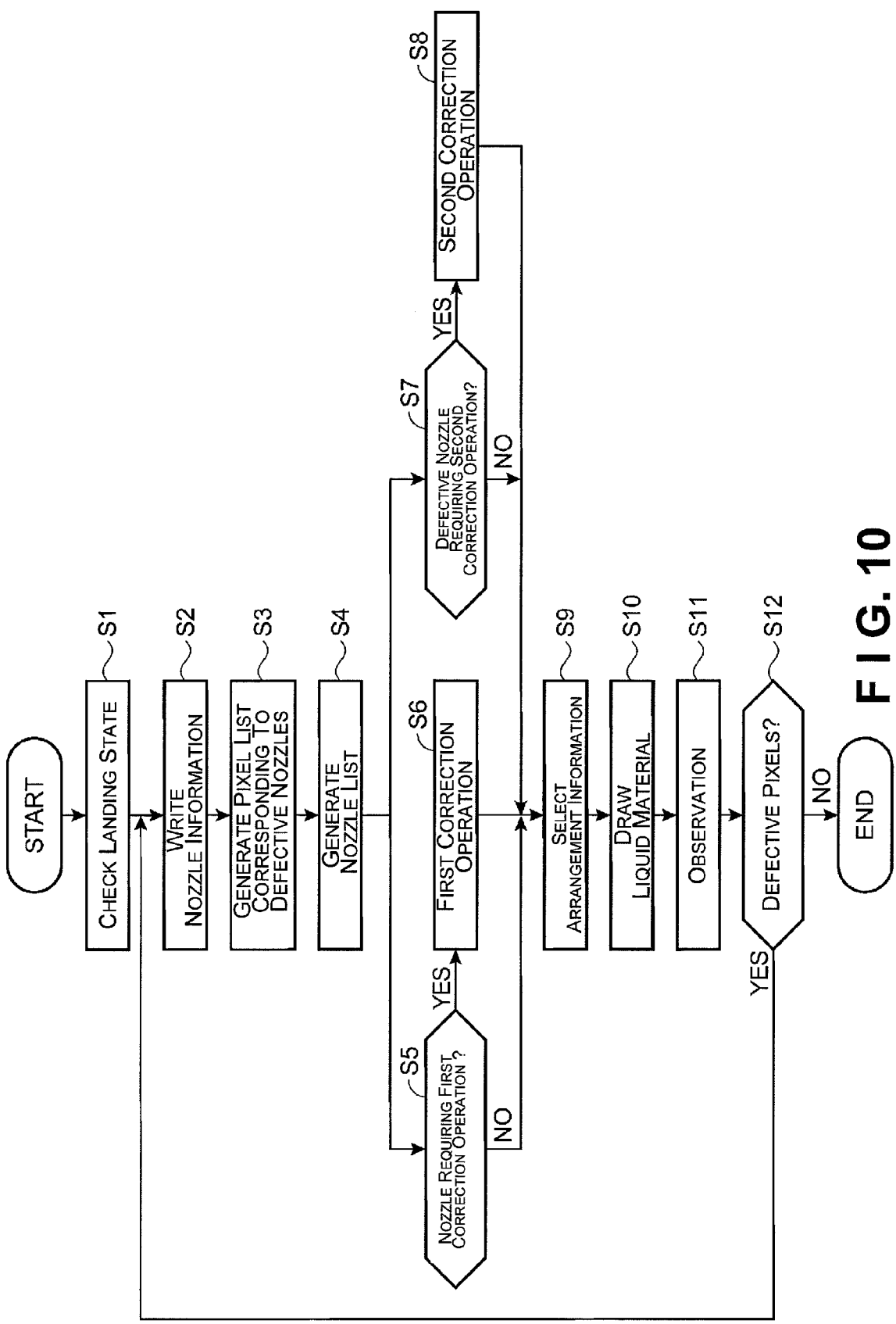
FIG. 10 is a flowchart showing the liquid material drawing method.

The liquid material drawing method of the present embodiment will next be described based on FIGS. 10 through 15. FIG. 10 is a flowchart showing the liquid material drawing method.

As shown in FIG. 10, the liquid material drawing method of the present embodiment is provided with a landing state checking step (step S1) as a landing observation step for observing the droplets D that have landed on the landing observation discharge object, and a step (step S2) for writing the nozzle information obtained in the landing state checking step in the memory unit 14. A step (step S3) for generating a pixel list (color region A list) that corresponds to nozzles 52 (defective nozzles) in which a discharge defect occurs in the nozzle information, and a step (step S4) for generating a nozzle list in which the defective nozzles are ranked are also provided. A step (step S5) for referencing the nozzle list to determine whether a defective nozzle is present for which a first correction operation is applied, and a step (step S6) for performing the first correction operation when an applicable defective nozzle is present are also provided. A step (step S7) for referencing the nozzle list in the same manner to determine whether a nozzle is present for which a second correction operation is applied, and a step (step S8) for performing the second correction operation when an applicable defective nozzle is present are also provided. The first correction operation and the second correction operation are operations for correcting the first arrangement information according to the discharge characteristics of a defective nozzle. A step (step S9) for selecting the arrangement information of appropriate nozzles 52 prior to discharging and drawing of the liquid material, and a drawing step (step S110) for discharging and drawing the liquid material based on the selected arrangement information are also provided. An observation step (step S11) for observing the discharged and drawn motherboard W, and a step (step S12) for determining based on the observation step whether a defective pixel is present are also provided.

Figure 11A:
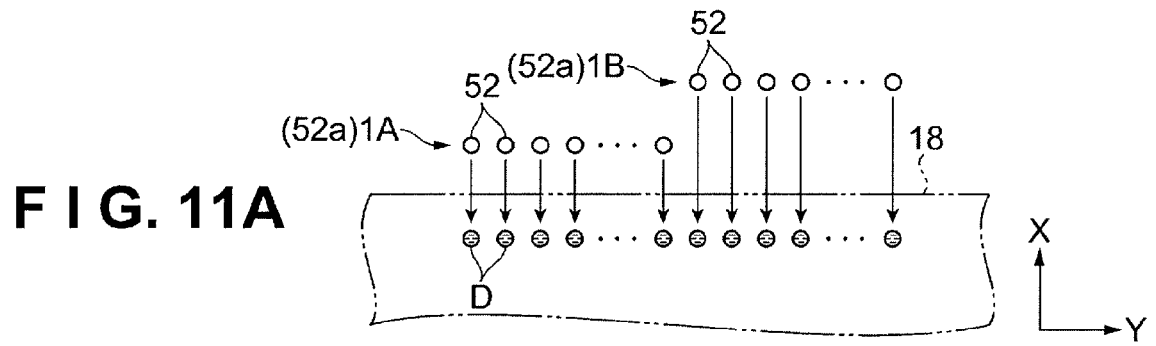
FIGS. 11A through 11D are schematic views showing the landing state checking step.

FIGS. 11A through 11D are schematic diagrams showing the landing state checking step. In the landing state checking step (step S1) shown in FIG. 10, a recording paper 18 as the landing observation discharge object is mounted on the setting table 5 (see FIG. 2) of the droplet discharge device 10 as shown in FIG. 11A. Droplets D of the same type (same color) are discharged from the nozzles 52 of the droplet discharge heads 50 so as to land on an imaginary straight line in the Y-axis direction. Specifically, the control unit 4 moves the head unit 9 and the setting table 5 relative to each other, and varies the discharge timing of each nozzle row 52a so that the droplets are landed on the straight line in the primary scanning direction (X-axis direction). The landing state of the droplets D landed on the recording paper 18 is then observed using the camera 15. For example, droplets D are discharged from nozzle row IA and nozzle row 1B for discharging the red (R) liquid material 80R, and when there are no defects in the discharge state, the droplets D land on the straight line. When the discharged quantity of droplets D is substantially equal among the nozzles 52, the landing diameters of the landed droplets D are substantially the same.

Figure 11B:
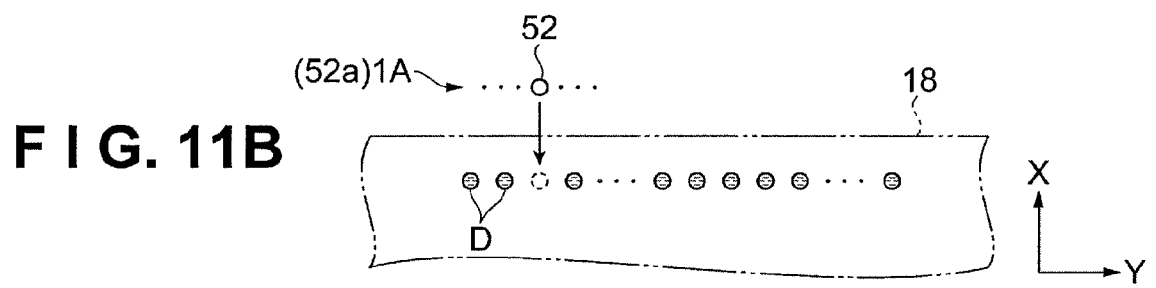

As shown in FIG. 11B, when blockage occurs in a certain nozzle 52 of nozzle row 1A, for example, the droplets D are not discharged. Specifically, a gap occurs in the landing of the droplets D on the recording paper 18, and a nozzle 52 in which missing discharge occurs (hereinafter referred to as a missing-discharge nozzle) can therefore be detected (identified).

Figure 11C:
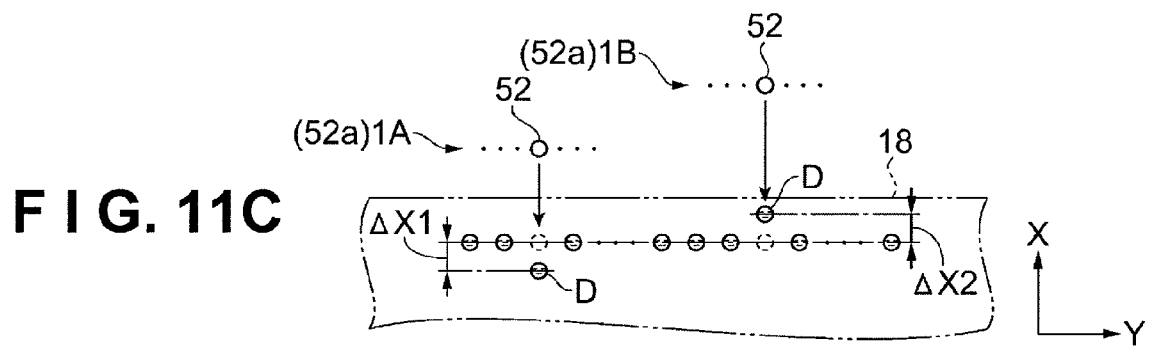

As shown in FIG. 11C, when a nozzle 52 in which flight deflection in the primary scanning direction occurs is present in nozzle row 1A and nozzle row 1B, for example, the discharged droplets D land in a position that is offset from the straight line. Such a landing state is imaged, and image processing is performed, whereby the CPU 41 can calculate deviation amounts ΔX1, ΔX2 and detect (identify) a nozzle 52 in which landing deviation occurs (hereinafter referred to as a landing-position-deviated nozzle). It is apparent that the landing position is not limited to the X-axis direction (primary scanning direction), and may be offset at an angle. The deviation amount is therefore computed as a deviation amount in the X-axis direction and a deviation amount in the Y-axis direction. The deviation amount in the landing position of droplets D discharged from nozzles 52 in which flight deflection occurs also varies according to the direction of relative movement between the droplet discharge heads 50 (plurality of nozzles 52) and the discharge object. Accordingly, the recording paper 18 is moved back and forth in the primary scanning direction with respect to the head unit 9 on which the droplet discharge heads 50 are mounted, and droplets D are discharged so as to land on different imaginary straight lines for positive and negative movement, and the landing state is observed.

Figure 11D:
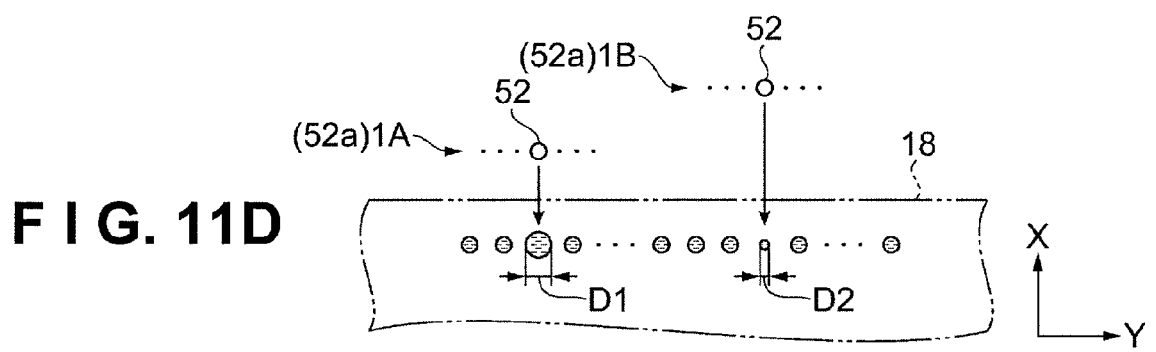

As shown in FIG. 11D, when a nozzle 52 for which the discharge quantity is excessive is present in nozzle row 1A, for example, the landing diameter D1 is too large. When a nozzle 52 for which the discharge quantity is too small is present in nozzle row 1B, the landing diameter D2 is too small. A nozzle 52 in which discharge quantity abnormality occurs (hereinafter referred to as an abnormal discharge quantity nozzle) can be detected (identified) by capturing an image of such a landing state and performing image processing. The process then proceeds to step S2.

In step S2 shown in FIG. 10, the upper-level computer 11 writes the information of missing-discharge nozzles, landing-position-deviated nozzles, and abnormal discharge quantity nozzles identified as defective nozzle in step S1 as nozzle information in the memory unit 14.

FIG. 12 is a table showing an example of the nozzle information. As shown in FIG. 12, the nozzle information includes information relating to missing discharge, landing position deviation, and landing diameter as discharge characteristics for each nozzle 52. In this case, a "1" is inputted to indicate the presence of missing discharge, and a "0" is inputted to indicate the absence of missing discharge. The nozzle 52 having the nozzle number "N2" is indicated as exhibiting missing discharge.

The landing diameter is classified into two levels of overly large and overly small based on a case in which a prescribed quantity of droplets D are discharged. The levels are linked to levels for setting the drive voltage of the transducers 59 for varying the discharge quantity. The corresponding case is designated as "1," and the non-corresponding case is designated as "0." The case of "0" indicates a standard landing diameter. Missing discharge is determined to have occurred when the landing diameter is smaller than overly small. The setting of an overly large or overly small landing diameter is performed with consideration for fluctuation in the discharge quantity per droplet that affects the necessary quantity of the liquid material according to the size of the standard discharge quantity of the droplets D, or the number of droplets D that must be discharged to provide the necessary quantity in the pixel regions (color regions A). Accordingly, the use of the two levels of overly large and overly small is not limiting, and the number of setting levels may be increased or decreased. In this case, "overly small" is indicated by nozzle number "N4," and "overly large" is indicated for nozzle number "N5."

The landing position deviation is divided into deviation in the X-axis direction (primary scanning direction) and deviation in the Y-axis direction (secondary scanning direction), and the amount of deviation is inputted in units (10 μm) of discharge resolution wherein "+" indicates deviation in the same direction as the scanning direction, and "−" indicates deviation in the opposite direction from the scanning direction. In this case, the discharged droplets D from the nozzle 52 whose nozzle number is "N3" land with a deviation of 40 μm in the primary scanning direction. The droplets D discharged from the nozzle 52 whose nozzle number is "N6" land with a deviation of 20 μm in the opposite direction from the primary scanning direction. The process then proceeds to step S3.

In step S3 shown in FIG. 10, the upper-level computer 11 generates a pixel list (in other words, a list of color regions A) of pixels with which a defective nozzle coincides during primary scanning based on the first arrangement information and the nozzle information stored in the memory unit 14. Generation of the pixel list will be described based on FIGS. 13 and 14.

Figure 13A:
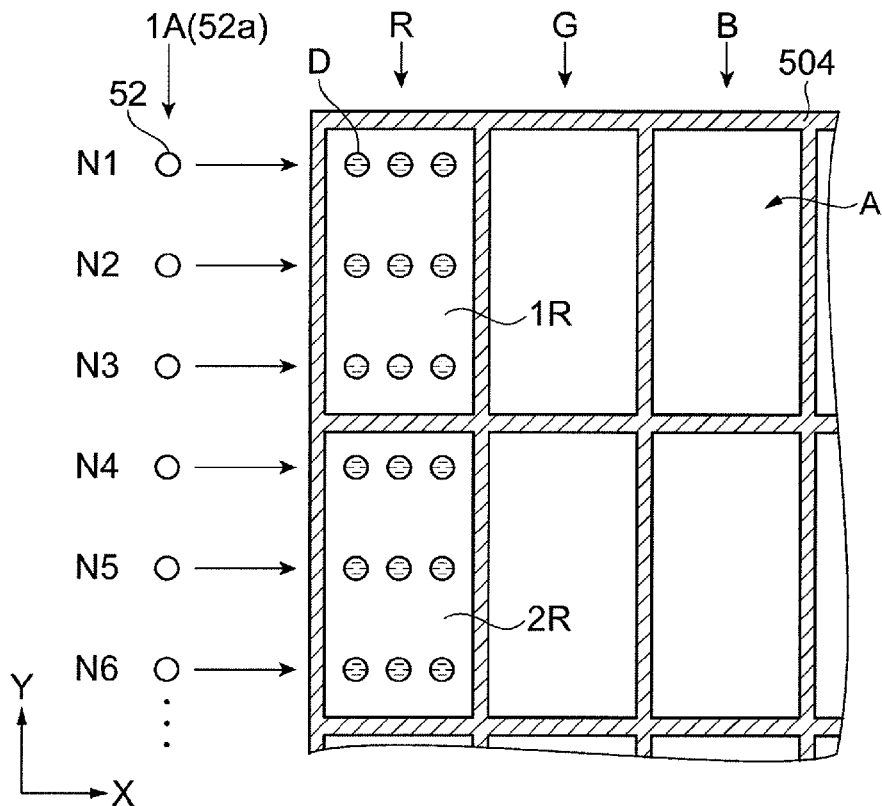
FIGS. 13A and 13B are schematic plan views showing an example of the arrangement of droplets in the pixel regions.
Figure 13B:
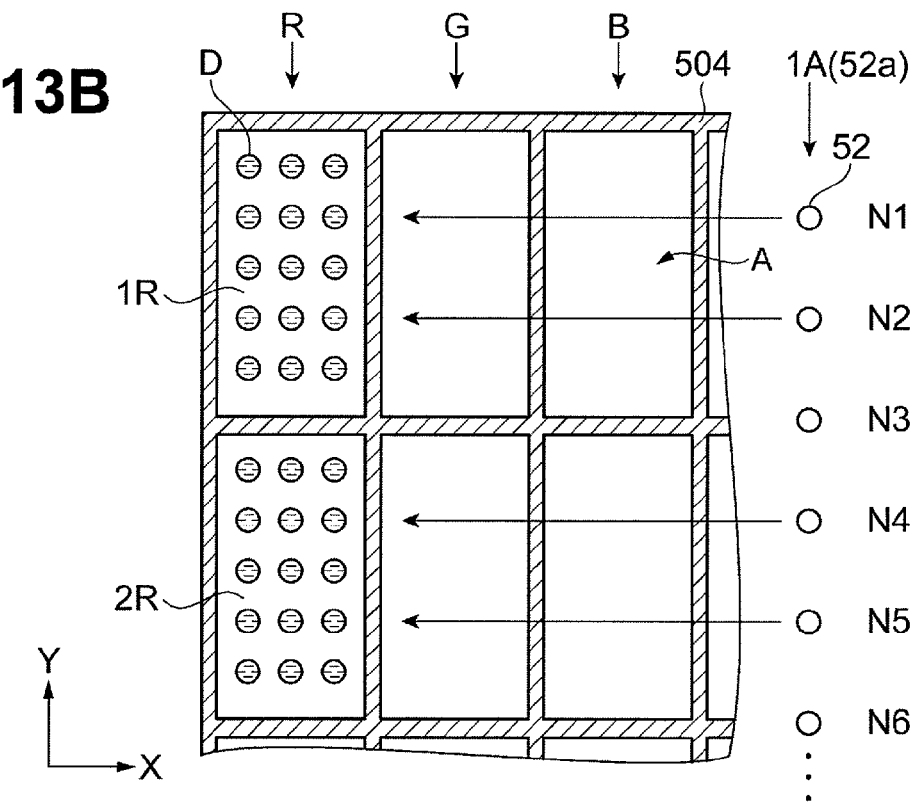

FIG. 13 is a schematic plan view showing an example of the arrangement of droplets in the pixel regions. Specifically, FIG. 13A is a schematic plan view showing the arrangement of droplets during positive movement in primary scanning, and FIG. 13B is a schematic plan view showing the arrangement of droplets during negative movement in primary scanning.

As shown in FIG. 13A, droplets D are discharged during relative movement of the head unit 9 and the motherboard W in the primary scanning direction (X-axis direction), and the droplets are arranged in the color regions A as pixel regions that are partitioned by the banks 504, for example. In this case, three discharges are performed in each of the color regions A with which the nozzles N1 through N3 of nozzle row 1A for discharging the red (R) liquid material 80R coincide during positive movement, and nine droplets D are arranged. The same applies for nozzles N4 through N6. As shown in FIG. 13B, during negative movement, the head unit 9 is secondarily scanned, the position of nozzle row 1A is offset, three discharges are performed from each of the nozzles N1 and N2 that coincide with the color region A, and six more droplets D are arranged so as to land between the previously arranged droplets D. Two primary scans are thereby performed to arrange a total of fifteen droplets D in the color region A. The same process is performed in the color regions A for the other colors (G, B). It is apparent that the number of nozzles 52 that coincide with the color regions A varies according to the size of the color region A and the arrangement thereof on the motherboard W, and the nozzle pitch of the nozzles 52 or the positioning of the nozzle rows 52a with respect to the color regions A.

FIGS. 13A and 13B show the arrangement of droplets D, and do not show the actual landing state. In other words, FIGS. 13A and 13B show the arrangement of the nozzles 52 that coincide with each color region A in positive movement and negative movement of primary scanning.

FIG. 14 is a table showing the nozzle arrangement information and the nozzle list. Specifically, FIG. 14A is a table showing the first arrangement information; FIG. 14B is a table showing the nozzle list; and FIG. 14C is a table showing the corrected second arrangement information.

The arrangement of droplets D shown in FIGS. 13A and 13B is based on the first arrangement information shown in FIG. 14A. The first arrangement information includes information relating to the pixel number of the color region A, the nozzle number, the nozzle selection (1: selection; 0: non-selection), the number of discharges, the drive voltage, and the discharge timing. The information is divided into a positive movement scan 1 and a negative movement scan 2. Such first arrangement information is created in advance for the liquid material 80R, 80G, 80B, i.e., for each color. In the drive voltage, "1" indicates a case in which Vc and Vh shown in FIG. 7 have standard voltage settings. Since the discharge quantity of droplets D is varied by varying the voltage settings, different levels of voltage settings are linked to other numerical values. The reference discharge timing is also indicated as "1," and different discharge timing settings for increasing or decreasing the discharge timing are linked as other numerical values.

For example, the nozzle 52 whose nozzle number is "N3" that coincides with the color region A whose pixel number is "1R" is selected in the positive movement scan 1, and three discharges are performed at the standard drive voltage and discharge timing. In the negative movement scan 2, the nozzle 52 whose nozzle number is "N3" coincides with the bank 504 as shown in FIG. 13B, and is therefore not selected. In the same manner, the nozzle 52 whose nozzle number is "N6" that coincides with the color region A whose pixel number is "2R" is selected in the positive movement scan 1, and three discharges are performed at the standard drive voltage and discharge timing. In the negative movement scan 2, this nozzle coincides with the bank 504, and is therefore not selected.

In such first arrangement information, the discharge characteristics of the plurality of nozzles 52 are assumed to be normal. Therefore, when the nozzles 52 have such discharge characteristics as those shown in FIG. 12, correcting (modifying) the first arrangement information in advance to perform discharge and drawing is more efficient than using the maintenance mechanism to restore the plurality of nozzles 52. The upper-level computer 11 thus generates a list of color regions A (pixels) with which a defective nozzle coincides based on the first arrangement information that indicates the arrangement of nozzles 52 that coincide with each color region A through primary scanning, and the information shown in FIG. 12 of the nozzles 52 (defective nozzles) in which discharge defects occur. The process then proceeds to step S4.

In step S4 shown in FIG. 10, defective nozzles are ranked in the color regions A with which the defective nozzles coincide. In this case, a missing-discharge nozzle is positioned with the highest rank of 1, followed by the rank of 2 for abnormal discharge quantity nozzles, and then landing-position-deviated nozzles are ranked 3 and 4 according to the amount of deviation, as shown in FIG. 14B. A specific example of a method for assigning the ranks is a method whereby a valuation is provided for different discharge characteristics with respect to defective nozzles, and defective nozzles having a high valuation are highly ranked. All the information generated from step S2 to step S4 is nozzle information. Specifically, in this case, steps S1 through S4 correspond to the nozzle information generation step.

Since droplets D are not discharged even when a missing-discharge nozzle is selected, such a nozzle is preferably excluded from selection in advance. The defects in abnormal discharge quantity nozzles and landing-position-deviated nozzles can be corrected according to the severity of the defect, and as many nozzles as possible are selected so that the plurality of nozzles 52 is effectively utilized. However, the more droplet discharge heads 50 are used for discharge and drawing, the more difficult it is to maintain the nozzles 52 in a normal discharge state. In the subsequent step, the first arrangement information is corrected according to nozzle rank even when a defective nozzle is present.

Step S5 in FIG. 10 is a step for determining whether a nozzle is present for which the first correction operation is applied. In this case, one defective nozzle that is highly ranked is selected from the nozzle list in FIG. 14B. The rank-1 missing-discharge nozzle "N2" for pixel number "1R" is designated as a defective nozzle for which the first correction operation will be applied, and since there are no rank-1 defective nozzles present for pixel number "2R," the rank-2 abnormal discharge nozzle "N5" is designated as a defective nozzle for which the first correction operation will be applied. Specifically, defective nozzles corresponding to rank 1 and rank 2 are applied.

Step S6 in FIG. 10 is a step for performing the first correction operation. The upper-level computer 11 corrects the first arrangement information so that the applied defective nozzles are not selected, and the needed droplets D are discharged from other nozzles 52.

Step S7 in FIG. 10 is a step for determining whether a defective nozzle is present for which the second correction operation is applied. In this step, a determination is made as to whether a defective nozzle is present that varies the drive conditions of the transducers 59. In this case, the rank-3 landing-position-deviated nozzle "N3" for pixel number "1R," the rank-2 abnormal discharge quantity nozzle "N4" for pixel number "2R," and the rank-4 landing-position-deviated nozzle "N6" from the nozzle list shown in FIG. 14B are designated as defective nozzles for application of the second correction operation.

Step S8 in FIG. 10 is a step for performing the second correction operation. The upper-level computer 11 corrects the first arrangement information so that the drive conditions of the transducers 59 of the applied defective nozzles are varies, and droplets D are discharged. Based on the nozzle information, the landing position is offset +40 μm in the primary scanning direction in the landing-position-deviated nozzle "N3" for pixel number "1R." The discharge timing is thus advanced according to the amount of deviation. Since the landing diameter is too small in the abnormal discharge nozzle "N4" for pixel number "2R," the drive voltage is set to a higher value so that the discharge quantity matches the reference quantity. The landing position is offset −20 μm in the primary scanning direction for the landing-position-deviated nozzle "N6." The discharging timing is therefore delayed according to the amount of offset. The process then proceeds to step S9.

Step S9 in FIG. 10 is a step for selecting arrangement information. When a defective nozzle is not present in the nozzle information, the first arrangement information is selected. There is actually a high probability that a defective nozzle is present among the plurality of nozzles 52, and the second arrangement information in which the first arrangement information is corrected by the upper-level computer 11 is selected by the first correction operation and the second correction operation. The process then proceeds to step S10.

Figure 15A:
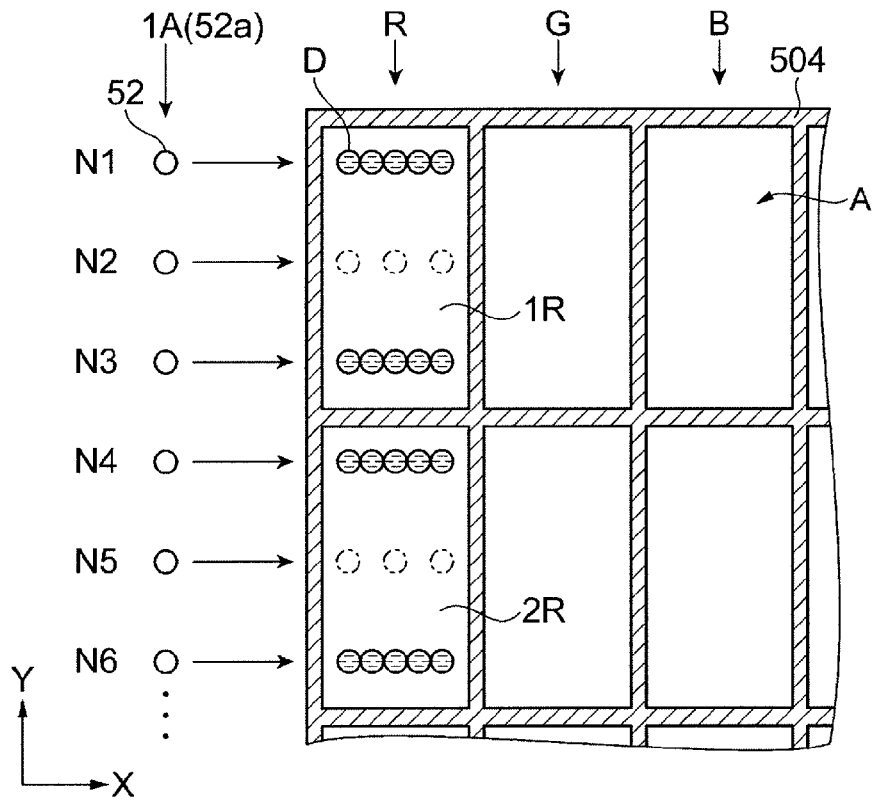
FIGS. 15A and 15B are schematic plan views showing an example of the arrangement of droplets based on the second arrangement information.
Figure 15B:
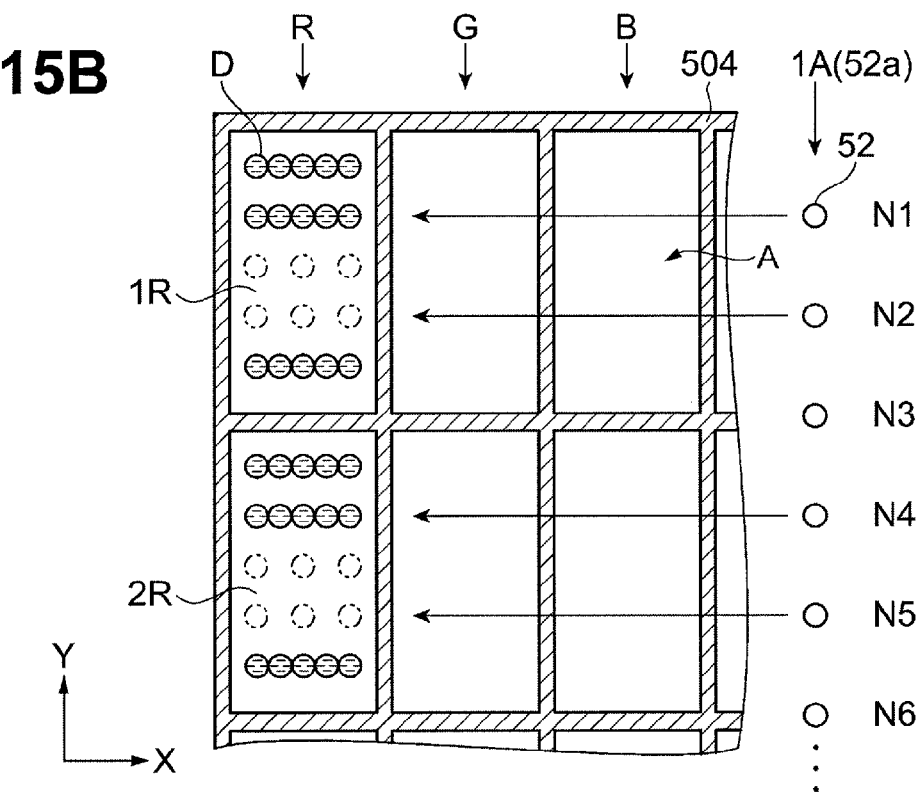

Step S10 in FIG. 10 is the drawing step for discharging and drawing the liquid material based on the selected arrangement information. FIGS. 15A and 15B are schematic plan views showing an example of the arrangement of droplets based on the second arrangement information. In the drawing step, based on the corrected second arrangement information shown in FIG. 14C, the "N2" nozzle 52 for pixel number "1R" is not selected, and discharge is performed five times from the "N1" and "N3" nozzles 52 as shown in FIG. 15A during positive movement in primary scanning. The discharge timing at which five droplets D are arranged in the color region A is designated as the reference "1," and a discharge timing "2" at which the start of discharge is earlier for the landing-position-deviated nozzle "N3" is set by correction. In the same manner, the "N5" nozzle 52 for pixel number "2R" is not selected, and discharge is performed five times from the "N4" and "N6" nozzles 52. The abnormal discharge quantity nozzle "N4" is set to level "2" at which a high drive voltage is set, and the landing-position-deviated nozzle "N6" is set to a discharge timing "3" having a later discharge initiation. Ten droplets D are thereby landed in pixel numbers "1R" and "2R," respectively.

During negative movement in the primary scanning, only the "N1" nozzle 52 for pixel number "1R" is selected, and discharge is performed five times, as shown in FIG. 15B. Only the "N4" nozzle 52 for pixel number "2R" is selected, and discharge is performed five times. Fifteen droplets D are thereby arranged in each color region A in the same manner as the arrangement of droplets D shown in FIG. 13B. Specifically, the necessary quantity of the red liquid material 80R is provided to the corresponding color regions A. Discharge drawing is also performed based on the second arrangement information corrected according to the discharge characteristics of defective nozzles in the same manner for the green liquid material 80G and the blue liquid material 80B as well. The process then proceeds to step S11.

Step S11 in FIG. 10 is the observation step. FIG. 16 is a schematic diagram showing the method for observing the motherboard. In the motherboard W as shown in FIG. 16, the region in which a color filter 505 is arranged in a single liquid crystal display device 500, for example, is designated as a single chip region, and nine chip regions C1 through C9 are arranged in a matrix. Color regions A of the same color are arranged in stripes in the Y-axis direction in each chip region C1 through C9. The color regions A as pixel regions of the motherboard W are observed by a method in which the upper-level computer 11 generates observation coordinates based on the first arrangement information. In this case, three colors of color regions A with which a plurality of nozzles 52 coincides in at least one primary scan may be observed. The observation coordinates, i.e., the observation region, is set for each chip region C1 through C9.

In step S11, the upper-level computer 11 transmits a control signal to the control unit 4 to cause relative movement of the movement stage 33 and the motherboard W, and the camera 15 is moved to the observation region of each chip region C1 through C9. In this case, the observation regions are observed in order starting from chip region C1 through chip regions C2 through C9. A route whereby efficient observation can be performed may be set based on the setting of the observation region. The process then proceeds to step S12.

In step S12 in FIG. 10, a determination is made as to whether defective pixels are present in the observation regions of the chip regions C1 through C9. When defective pixels having color irregularity or mixing are present, the coordinates of the defective pixels are identified from the observation coordinates. When defective pixels are present, process proceeds to step S2. In the nozzle information generation step, a nozzle 52 that coincides with the defective pixel is identified from the information (defect details, coordinates) of the defective pixel, and the nozzle information is updated to reflect the defective nozzle. Specifically, this step functions as a defective nozzle specifying step and a nozzle information updating step.

Fluctuation in the amount or direction of deviation is particularly likely to occur for a landing-position-deviated nozzle. In the process of updating the nozzle information, the history of the landing-position-deviated nozzle is stored as data, and a landing-position-deviated nozzle for which the fluctuation is large is preferably designated as a defective nozzle for applying the first correction operation.

Through such a liquid material drawing method, the first arrangement information is corrected according to the discharge characteristics of defective nozzles, and the liquid material is discharged and drawn based on corrected second arrangement information. The necessary quantity of the liquid material can therefore be provided for each pixel region (color region A).

The effects of the first embodiment are described below.

(1) The drawing system 1 of the first embodiment described above is provided with a memory unit 14 that stores nozzle information in which the plurality of nozzles 52 is ranked from lowest to highest in order of discharge characteristics that include landing position deviation of the droplets D, discharge quantity abnormality, and missing discharge; and an upper-level computer 11 as an arrangement information generation unit for generating second arrangement information in which the first arrangement information is corrected according to the discharge characteristics based on the nozzle information. Accordingly, the second arrangement information is selected by the droplet discharge device 10 even when defective nozzles are present, and the necessary quantity of the liquid material can be discharged and drawn as droplets D from the plurality of nozzles 52 to the pixel regions (color regions A).

(2) The liquid material drawing method of the first embodiment is provided with a nozzle information generation step for generating nozzle information based on correct landing information of the droplets D obtained in the landing state checking step; and a first correction operation step and a second correction operation step as arrangement information generation steps for generating second arrangement information in which the first arrangement information is corrected according to discharge characteristics based on the generated nozzle information. Consequently, in the drawing step, the necessary amount of the liquid material for each pixel region can be provided by discharging and drawing the liquid material based on the second arrangement information even when the plurality of nozzles 52 includes a defective nozzle. A step for observing the pixel regions of the discharged and drawn motherboard W, a step for identifying a defective nozzle from the coordinates of a defective pixel when a defective pixel is detected by observation, and a step for updating the nozzle information based on the information of the specified defective nozzle are also provided. Consequently, since arrangement information can be generated based on the newest nozzle information, discharge defects can be reduced, and the necessary quantity of the liquid material can be stably provided for each pixel region.

(3) Since the color filter manufacturing method of the first embodiment uses the abovementioned liquid material drawing method, the occurrence of defective pixels due to discharge defects can be reduced, and the necessary quantity of the liquid material 80R, 80G, 80B can be discharged and drawn in the form of droplets D in each corresponding color region A. In the film formation step, color layers 505R, 505G, 505B having a substantially constant film thickness are obtained. Color filters 505 in which color irregularity or mixing is reduced can therefore be manufactured at high yield. When the opposing substrate 501 provided with the color filters 505 is used, a liquid crystal display device 500 having the desired optical characteristics can be obtained.

Second Embodiment

Figure 17:
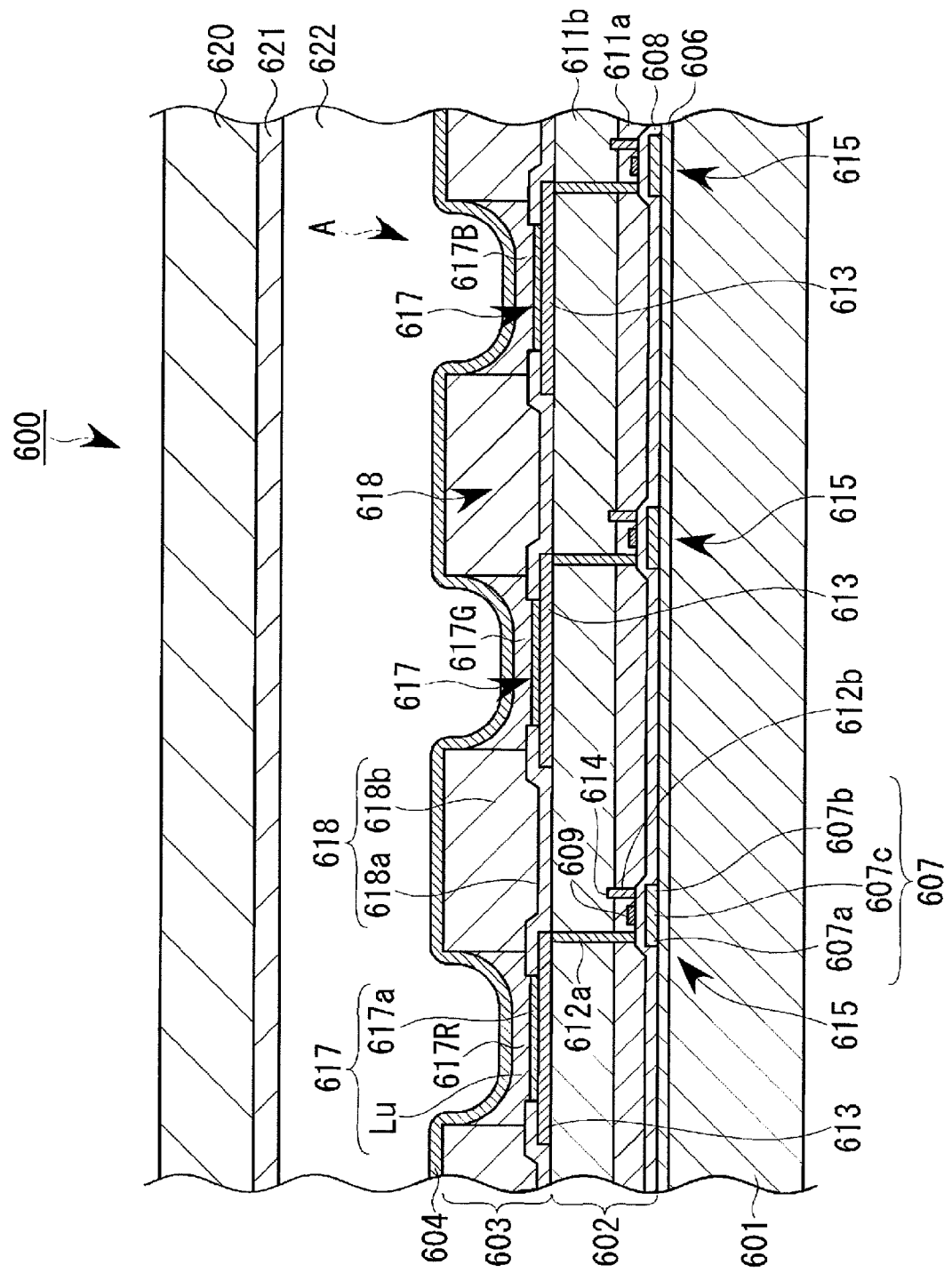
FIG. 17 is a schematic sectional view showing the relevant parts of the structure of the organic EL display device.

Referring now to FIGS. 17 and 18, an organic EL element manufacturing method in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the method for manufacturing an organic EL element having a luminescent layer, the drawing system 1 and the liquid material drawing method of the first embodiment are applied.

The organic EL display device having the organic EL element will first be briefly described. FIG. 17 is a schematic sectional view showing the relevant parts of the structure of the organic EL display device. As shown in FIG. 17, the organic EL display device 600 is provided with an element substrate 601 that has a luminescent element part 603 as the organic EL element; and a sealing substrate 620 that is sealed at a distance from the element substrate 601 and a space 622. The element substrate 601 is also provided with a circuit element part 602 on the element substrate 601, and the luminescent element part 603 is formed over the circuit element part 602 and driven by the circuit element part 602. Three colors of luminescent layers 617R, 617G, Lu are formed in luminescent layer formation regions A as pixel regions in a striped pattern in the luminescent element part 603. In the element substrate 601, three luminescent layer formation regions A that correspond to three colors of color layers 617R, 617G, Lu form a single set of picture elements, and the picture elements are arranged in a matrix on the circuit element part 602 of the element substrate 601. In the organic EL display device 600, the light emitted from the luminescent element part 603 is emitted toward the element substrate 601.

The sealing substrate 620 is composed of glass or metal, and is bonded to the element substrate 601 via a sealing resin. A getter agent 621 is affixed to the sealed inside surface. The getter agent 621 absorbs water or oxygen that enters the space 622 between the element substrate 601 and the sealing substrate 620 and prevents the luminescent element part 603 from being degraded by the contaminating water or oxygen. The getter agent 621 may also be omitted.

The element substrate 601 has a plurality of luminescent layer formation regions A as pixel regions on the circuit element part 602, and is provided with barrier parts 618 for partitioning the plurality of luminescent layer formation regions A; electrodes 613 formed in the plurality of luminescent layer formation regions A; and positive hole implantation/transport layers 617a that are layered on the electrodes 613. The luminescent element part 603 is also provided that has luminescent layers 617R, 617G, Lu formed by applying the three types of the liquid material that include a luminescent-layer-forming material in the plurality of luminescent layer formation regions A. The barrier parts 618 are composed of lower-layer banks 618a, and upper-layer banks 618b that essentially partition the luminescent layer formation regions A, wherein the lower-layer banks 618a are provided so as to protrude into the luminescent layer formation regions A, and the electrodes 613 and the luminescent layers 617R, 617G, Lu are formed by $SiO_2$ or another inorganic insulation material so as to prevent direct contact and electrical short circuiting with each other.

The element substrate 601 is composed of glass or another transparent substrate, for example, a base protective film 606 composed of a silicon oxide film is formed on the element substrate 601, and islands of semiconductor films 607 composed of polycrystalline silicon are formed on the base protective film 606. A source region 607a and a drain region 607b are formed by high-concentration P ion implantation in the semiconductor films 607. The portion into which P is not implanted is the channel region 607c. A transparent gate insulation film 608 for covering the base protective film 606 and the semiconductor films 607 is also formed, gate electrodes 609 composed of Al, Mo, Ta, Ti, W, or the like are formed on the gate insulation film 608, and a transparent first interlayer insulation film 611a and second interlayer insulation film 611b are formed on the gate electrodes 609 and the gate insulation film 608. The gate electrodes 609 are provided in positions that correspond to the channel regions 607c of the semiconductor films 607. Contact holes 612a, 612b that are connected to the source regions 607a and the drain regions 607b, respectively, of the semiconductor films 607 are also formed so as to penetrate through the first interlayer insulation film 611a and the second interlayer insulation film 611b. Transparent electrodes 613 composed of ITO (Indium Tin Oxide) are patterned in a prescribed shape and arranged (electrode formation step) on the second interlayer insulation film 611b, and the contact holes 612a on one side are connected to the electrodes 613. The other contact holes 612b are connected to power supply lines 614. Thin film transistors 615 for driving that are connected to the electrodes 613 are formed in the circuit element part 602 in this manner. Retention capacitors and thin film transistors for switching are also formed in the circuit element part 602, but these components are not shown in FIG. 17.

The luminescent element part 603 is provided with electrodes 613 as positive electrodes, positive hole implantation/transport layers 617a and the luminescent layers 617R, 617G, Lu (referred to generically as luminescent layers Lu) that are layered in sequence on the electrodes 613, and a negative electrode 604 that is layered so as to cover the upper-layer banks 618b and the luminescent layers Lu. A functional layer 617 in which luminescence is induced is composed of the positive hole implantation/transport layers 617a and the luminescent layers Lu. Using a transparent material to form the negative electrode 604, the sealing substrate 620, and the getter agent 621 enables the light generated from the direction of the sealing substrate 620 to be emitted.

The organic EL display device 600 has scanning lines (not shown) connected to the gate electrodes 609, and signal lines (not shown) connected to the source regions 607a, and when the thin film transistors (not shown) for switching are turned on by the scanning signal transmitted to the scanning lines, the potential of the signal lines at that time is maintained by retention capacitors, and the on/off state of the thin film transistors 615 for driving is determined according to the state of the retention capacitors. Electric current flows from the power supply lines 614 to the electrodes 613 via the channel regions 607c of the thin film transistors 615 for driving, and the electric current then flows to the negative electrode 604 via the positive hole implantation/transport layers 617a and the luminescent layers Lu. The luminescent layers Lu emit light according to the amount of flowing current. The organic EL display device 600 can display the desired characters or image through the light emission mechanism of the luminescent element part 603 thus configured.

Organic EL Element Manufacturing Method

The method for manufacturing a luminescent element part as the organic EL element of the present embodiment will next be described based on FIG. 18. FIGS. 18A through 18F are schematic sectional views showing the method for manufacturing a luminescent element part. The circuit element part 602 formed on the element substrate 601 is not shown in FIGS. 18A through 18F.

The method for manufacturing the luminescent element part 603 of the present embodiment is provided with a step for forming the electrodes 613 in positions that correspond to the plurality of luminescent layer formation regions A of the element substrate 601, and a barrier part formation step for forming the lower-layer banks 618a so as to partially overlap on the electrodes 613, and forming the upper-layer banks 618b on the lower-layer banks 618a so as to essentially partition the luminescent layer formation regions A. The manufacturing method is also provided with a step for performing surface treatment of the luminescent layer formation regions A that are partitioned by the upper-layer banks 618b, a step for applying the liquid material that includes a positive hole implantation/transport layer forming material in the surface-treated luminescent layer formation regions A to draw the positive hole implantation/transport layers 617a by discharging, and a step for drying the discharged liquid material to form the positive hole implantation/transport layers 617a. The manufacturing method is also provided with a step for performing surface treatment of the luminescent layer formation regions A in which the positive hole implantation/transport layers 617a are formed, a drawing step for discharging and drawing three types of the liquid material that includes the luminescent layer forming material in the surface-treated luminescent layer formation regions A, and a curing step for drying the discharged three types of the liquid material to form the luminescent layers Lu. The manufacturing method is furthermore provided with a step for forming the negative electrode 604 so as to cover the upper-layer banks 618b and the luminescent layers Lu.

Figure 18A:
FIGS. 18A through 18F are schematic sectional views showing the method for manufacturing a luminescent element part as the organic EL element.

In the electrode (positive electrode) formation step, the electrodes 613 are formed in positions that correspond to the luminescent layer formation regions A of the element substrate 601 on which the circuit element part 602 is already formed, as shown in FIG. 18A. In an example of the formation method, a transparent electrode film is formed on the surface of the element substrate 601 by sputtering or vapor deposition in a vacuum using ITO or another transparent electrode material. A photolithography method is then used to leave only the necessary portion, and the electrodes 613 may be formed by etching. The element substrate 601 is covered in advance by a photoresist, and exposure/development are performed so as to open the regions for forming the electrodes 613. A transparent electrode film of ITO or the like may then be formed in the open parts, and the remaining photoresist may be removed. The process then proceeds to the bank formation step.

Figure 18B:
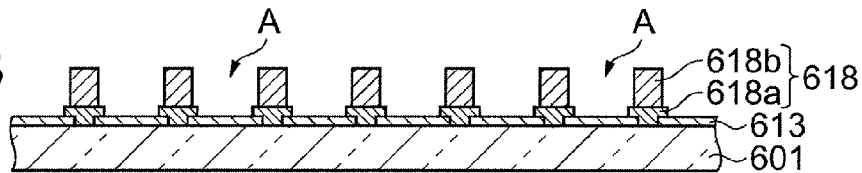

In the barrier part formation step, the lower-layer banks 618a are formed so as to cover portions of the plurality of electrodes 613 of the element substrate 601, as shown in FIG. 18B. The material used to form the lower-layer banks 618a is $SiO_2$ (silicon dioxide), which is an inorganic material having insulation properties. In an example of the method for forming the lower-layer banks 618a, the surfaces of the electrodes 613 are masked using a resist or the like so as to correspond to the subsequently formed luminescent layers Lu. The masked element substrate 601 is then placed in a vacuum device, and the lower-layer banks 618a are formed by sputtering or vacuum deposition using $SiO_2$ as the target or source material. The resist or other mask is subsequently peeled off. Since the lower-layer banks 618a are formed by $SiO_2$, adequate transparency is obtained when the film thickness thereof is 200 nm or less, and light emission is not inhibited even when the positive hole implantation/transport layers 617a and the luminescent layers Lu are subsequently layered.

The upper-layer banks 618b are then formed on the lower-layer banks 618a so as to essentially partition the luminescent layer formation regions A. The material used to form the upper-layer banks 618b is preferably a material that is durable with respect to the solvent of the three types of liquid material 100R, 100G, 100B that include the luminescent layer forming material described hereinafter, and a material that can be given a fluid-repellent treatment through the use of a plasma treatment using a fluorine-based gas as the treatment gas is preferred, e.g., an organic material such as an acrylic resin, an epoxy resin, a photosensitive polyimide, or the like. In an example of the method for forming the upper-layer banks 618b, the abovementioned photosensitive organic material is applied by roll coating or spin coating to the surface of the element substrate 601 on which the lower-layer banks 618a are formed, and the coating is dried to form a photosensitive resin layer having a thickness of about 2 μm. A mask provided with open parts whose size corresponds to the luminescent layer formation regions A is then placed against the element substrate 601 in a prescribed position, and exposure/development is performed, whereby the upper-layer banks 618b are formed. The barrier parts 618 having lower-layer banks 618a and upper-layer banks 618b are thereby formed. The process then proceeds to the surface treatment step.

In the step for treating the surfaces of the luminescent layer formation regions A, the surface of the element substrate 601 on which the barrier parts 618 are formed is first plasma treated using $O_2$ gas as the treatment gas. The surfaces of the electrodes 613, the protruding parts of the lower-layer banks 618a, and the surfaces (including the wall surfaces) of the upper-layer banks 618b are thereby activated and lyophilized. Plasma treatment is then performed using $CF_4$ or another fluorine-based gas as the treatment gas. The fluorine-based gas is thereby reacted with only the surfaces of the upper-layer banks 618b that are composed of the photosensitive resin as an organic material, and the surfaces are rendered fluid repellent. The process then proceeds to the positive hole implantation/transport layer formation step.

Figure 18C:
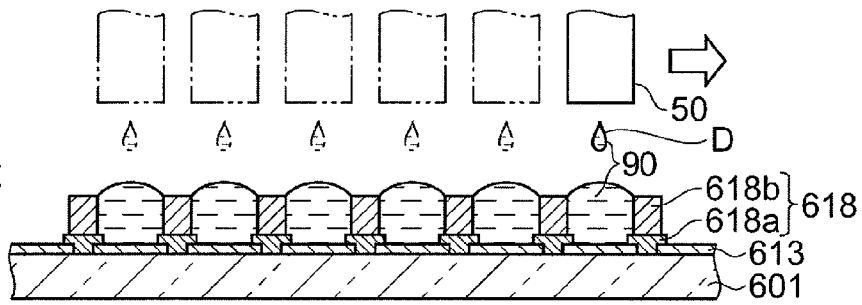

In the positive hole implantation/transport layer formation step, a liquid material 90 that includes a positive hole implantation/transport layer forming material is applied in the positive hole implantation/transport layer formation regions A, as shown in FIG. 18C. The drawing system 1 shown in FIG. 1 is used as the method for applying the liquid material 90. The liquid material 90 discharged from the droplet discharge heads 50 lands as droplets D on the electrodes 613 of the element substrate 601 and spreads. The necessary amount of the liquid material 90 according to the surface area of the luminescent layer formation regions A is discharged as droplets D. The process then proceeds to the drying/film-formation step.

In the drying/film-formation step, the solvent component of the liquid material 90 is dried and removed by heating the element substrate 601 by a lamp annealing method or other method, for example, and the positive hole implantation/transport layers 617a are formed in the regions partitioned by the lower-layer banks 618a of the electrodes 613. In the present embodiment, PEDOT (Polyethylene Dioxy Thiophene) is used as the positive hole implantation/transport layer forming material. Positive hole implantation/transport layers 617a composed of the same material are formed in the luminescent layer formation regions A in this case, but the material for forming the positive hole implantation/transport layers 617a may also be varied for each luminescent layer formation region A according to the subsequently formed luminescent layers Lu. The process then proceeds to the surface treatment step.

In the surface treatment step, when the positive hole implantation/transport layers 617a are formed using the abovementioned positive hole implantation/transport layer forming material, since the surfaces thereof repel the three types of liquid material 100R, 100G, 100B, a surface treatment is again performed so that at least the areas within the luminescent layer formation regions A are lyophilic. The surface treatment is performed by a method in which the solvent used in the three types of liquid material 100R, 100G, 100B is applied and dried. A spraying method, a spin coating method, or other method may be used to apply the solvent. The process then proceeds to the luminescent layer Lu drawing step.

Figure 18D:
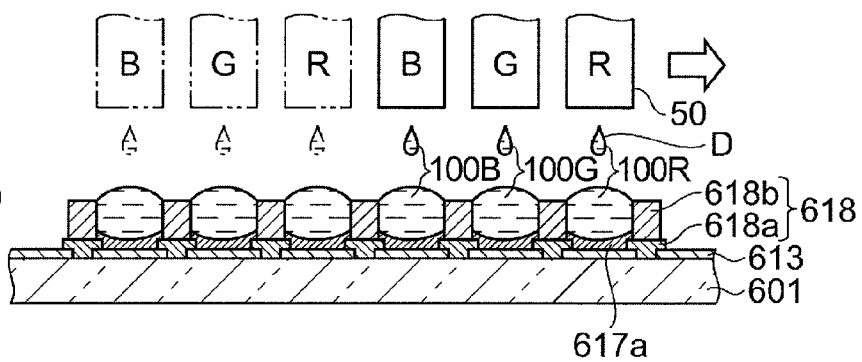

In the luminescent layer Lu drawing step, the drawing system 1 is used to apply the three types of liquid material 100R, 100G, 100B including the luminescent layer forming material from the plurality of droplet discharge heads 50 to the plurality of luminescent layer formation regions A, as shown in FIG. 18D. The liquid material 100R includes a material for forming the luminescent layers 617R (red), the liquid material 100G includes a material for forming the luminescent layers 617G (green), and the liquid material 100B includes a material for forming the luminescent layers 617B (blue). The liquid materials 100R, 100G, 100B are applied in the luminescent layer formation regions A using the liquid material drawing method of the first embodiment. In this case, it is difficult to distinguish between the colors of the liquid materials 100R, 100G, 100B. Therefore, an illumination device that emits ultraviolet rays is used as a method for observing the landing state of the droplets D using the camera 15. The landed droplets D are thereby excited by the ultraviolet rays so as to emit light, and the landing state can therefore be observed and imaged. The nozzle information of a plurality of nozzles 52 is obtained in the landing state checking step, and the second arrangement information that is corrected based on the information of ranked nozzles is used to discharge and draw the liquid materials 100R, 100G, 100B. The occurrence of discharge defects is thereby reduced, and the necessary quantities of the liquid materials 100R, 100G, 100B are discharged and drawn as droplets D in the corresponding luminescent layer formation regions A. The process then proceeds to the curing step.

Figure 18E:
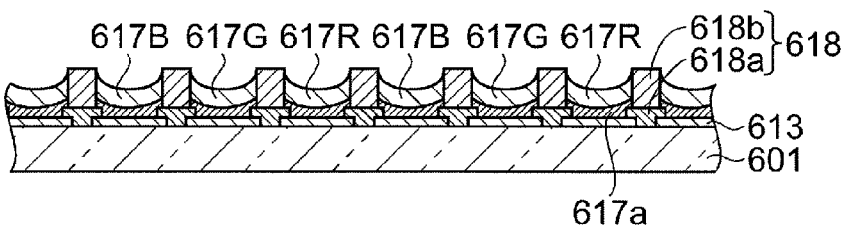

In the curing step, the solvent component of the discharged and drawn liquid materials 100R, 100G, 100B is dried and removed, and films are formed so that the luminescent layers 617R, 617G, 617B are layered on the positive hole implantation/transport layers 617a of the luminescent layer formation regions A, as shown in FIG. 18E. A vacuum drying method that enables the solvent to be evaporated at a substantially constant rate is preferred as the method for drying the element substrate 601 on which the liquid materials 100R, 100G, 100B are discharged and drawn. The process then proceeds to the negative electrode formation step.

Figure 18F:
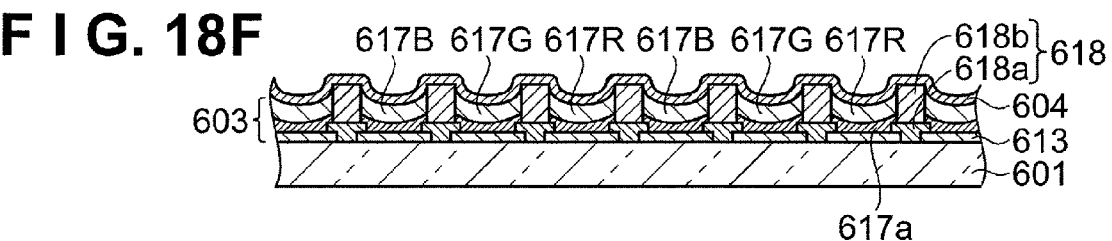

In the negative electrode formation step, the negative electrode 604 is formed so as to cover the upper-layer banks 618b and the luminescent layers 617R, 617G, 617B of the element substrate 601, as shown in FIG. 18F. A combination of Ca, Ba, Al, or another metal and LiF or another fluoride is preferably used as the material for forming the negative electrode 604. It is particularly preferred that a film of Ca, Ba, or LiF having a small work function be formed on the side towards the luminescent layers 617R, 617G, 617B, and that a film of Al or the like having a large work function be formed on the side facing away from the luminescent layers. A protective layer of $SiO_2$, SiN, or the like may also be layered on the negative electrode 604. The negative electrode 604 can thereby be prevented from oxidizing. Methods used to form the negative electrode 604 include vapor deposition, sputtering, CVD, and other methods. Vapor deposition is particularly preferred, since this method makes it possible to prevent the luminescent layers 617R, 617G, 617B from being damaged by heat.

The element substrate 601 completed in this manner has luminescent layers 617R, 617G, 617B in which the necessary quantities of the liquid materials 100R, 100G, 100B are applied in the corresponding luminescent layer formation regions A, and that have a substantially constant thickness after film formation.

The effects of the second embodiment are as described below.

(1) In the method for manufacturing the luminescent element part 603 according to the second embodiment, in the drawing step for the luminescent layers Lu, the necessary quantities of the liquid materials 100R, 100G, 100B are discharged and drawn in the form of droplets D in the luminescent layer formation regions A of the element substrate 601 using the drawing system 1 and the liquid material drawing method of the first embodiment. Consequently, a luminescent element part 603 having luminescent layers 617R, 617G, 617B in which the film thickness after film formation is substantially constant can be manufactured at high yield and with high productivity.

(2) When the element substrate 601 is used that is manufactured using the method for manufacturing the luminescent element part 603 according to the second embodiment, the thickness of the luminescent layers 617R, 617G, 617B is substantially constant, and the resistance of each luminescent layer 617R, 617G, 617B is therefore substantially constant. Uneven luminescence, uneven luminance, and other defects due to unequal resistance in each luminescent layer 617R, 617G, 617B is thereby reduced when the drive voltage is applied by the circuit element part 602 to the luminescent element part 603 to generate light. Specifically, an organic EL display device 600 can be provided that has attractive display quality and a minimal occurrence of uneven luminescence, uneven luminance, and other defects due to uneven discharge caused by flight deflection.

The illustrated embodiments of the present invention were described above, but various modifications may be added to the embodiments described above in ranges that do not depart from the intended scope of the present invention. Examples of modifications other than the abovementioned embodiments are described below.

MODIFICATION EXAMPLE 1

In the drawing system 1 of the first embodiment, the arrangement of the droplet discharge heads 50 (nozzle rows 52a) in the head unit 9 of the droplet discharge device 10 is not limited as such. For example, nozzle row 52a may be aligned so as to intersect with the primary scanning direction (X-axis direction). The nozzle pitch as viewed from the primary scanning direction is thereby reduced, and droplets D can be landed with higher resolution in the secondary scanning direction (Y-axis direction).

MODIFICATION EXAMPLE 2

In the drawing system 1 of the first embodiment, a configuration may be adopted in which the camera 15 for capturing an image of the landing state of droplets D that are landed on the recording paper 18, and the image processing unit 49 for processing the captured image are not provided to the drawing system 1. For example, a landing observation system provided with the camera 15 or the image processing unit 49 may be provided, and image information may be acquired by the upper-level computer 11 from the landing observation system.

MODIFICATION EXAMPLE 3

In the drawing system 1 of the first embodiment, the structure of the camera 15 as an imaging mechanism is not limited as such. For example, a configuration may be adopted in which a plurality of cameras 15 is provided according to the size of the motherboard W or the number of chip regions. This configuration enables more rapid observation. A configuration may also be adopted in which the camera 15 is not mounted on the movement stage 33 of the head movement mechanism 30, and the camera 15 is provided so as to be capable of moving in the Y-axis direction.

MODIFICATION EXAMPLE 4

In the drawing system 1 and the liquid material drawing method of the first embodiment, the method for landing the droplets D on the recording paper 18 is not limited to a method in which the recording paper 18 is mounted on the setting table 5. For example, a separate table for mounting the recording paper 18 in the Y-axis direction may be provided, and the table may be capable of moving in the X-axis direction. This configuration makes it possible to discharge droplets D onto the recording paper 18 in conjunction with discharging and drawing on the motherboard W.

MODIFICATION EXAMPLE 5

In the liquid material drawing method of the first embodiment, the method for acquiring the nozzle information is not limited to checking the landing state of the droplets D. For example, at least missing-discharge nozzles and abnormal discharge quantity nozzles can be identified by observing the flight state of the droplets D discharged from a nozzle row 52*a*.

MODIFICATION EXAMPLE 6

The liquid material drawing method of the first embodiment is not limited as such. For example, the nozzle information may be stored in advance as data in the memory unit 14. The landing state checking step need not be performed each time that discharging and drawing of a single motherboard W are performed. For example, the nozzle information can be effectively acquired by performing the landing state checking step at the start of operation, after maintenance of the droplet discharge heads 50 is performed, or at another appointed time. Furthermore, the step for observing the discharged and drawn motherboard W, and the step for determining the presence of defective pixels are not essential.

MODIFICATION EXAMPLE 7

In the liquid material drawing method of the first embodiment, the first arrangement information and the corrected second arrangement information are not limited as such. For example, the first arrangement information was configured so that a plurality (two) primary scans were performed arrange fifteen droplets D in each color region A as shown in FIGS. 13A and 13B. In contrast, a configuration is adopted in which five droplets D are discharged from each nozzle 52 that coincides with the color regions A so that a total of 25 droplets D are arranged. In the actual discharging and drawing, the second arrangement information is generated so that at least one nozzle 52 that coincides with the color regions A in each scan is a non-selected nozzle. Specifically, a defective nozzle is designated as a non-selected nozzle based on the nozzle information. The necessary quantity (15 droplets) of the liquid material can thereby be applied in each color region A in the same manner as in the first embodiment. When a prescribed nozzle is designated as non-selected for each pixel region in primary scanning in this manner, the first correction operation may be applied so that the non-selected nozzle is designated as a selected nozzle for another pixel region by the second correction operation. Since the method for driving defective nozzles is thereby complicated, it is preferred that a list of defective nozzles for which each correction operation is applied be created, and that an adjustment be made so that defective nozzles for which a correction operation is applied do not overlap.

MODIFICATION EXAMPLE 8

In the liquid material drawing method of the first embodiment, the method for correcting landing position deviation of the droplets D is not limited to varying the discharge timing of the corresponding nozzles. For example, in the case of landing position deviation in the primary scanning direction, the discharge initiation position during relative movement of the motherboard W and the nozzles 52 may be corrected. Landing position deviation is also not limited to the primary scanning direction, and may also occur in the secondary scanning direction. In this case, a method may be adopted in which the position of the head unit 9 in the secondary scanning direction is corrected.

MODIFICATION EXAMPLE 9

In the color filter manufacturing method of the first embodiment, and the organic EL element manufacturing method of the second embodiment, the arrangement of the color regions A and the luminescent layer formation regions A is not limited to a striped arrangement. The liquid material drawing method of the first embodiment can be applied to a delta arrangement or a mosaic arrangement. The configuration having three colors of color layers 505R, 505G, 505B is also not limiting, and the present invention can also be applied in a method for manufacturing a multicolor color filter in which other colors besides the RGB colors are combined.

MODIFICATION EXAMPLE 10

Device manufacturing methods in which the liquid material drawing method of the first embodiment can be applied are not limited to a color filter manufacturing method and an organic EL element manufacturing method. For example, the liquid material drawing method of the first embodiment can also be applied to a pixel electrode manufacturing method or a method for manufacturing a switching element that is formed in each pixel region in the liquid crystal display device 500 shown in FIG. 8, or the organic EL display device 600 shown in FIG. 17.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A drawing system for discharging a liquid material including a functional material from a plurality of nozzles to a plurality of pixel regions on a substrate in synchronization with a relative movement of the substrate and the nozzles to form pixel formation elements, the drawing system comprising:
   a memory unit configured and arranged to store at least nozzle information in which the nozzles are ranked according to discharge characteristics and first arrangement information that indicates an arrangement of each of the nozzles with respect to each of the pixel regions in the relative movement, the discharge characteristics including landing position deviation of the droplets, discharge quantity abnormality, and missing discharge, and the first arrangement information including selection information indicative of the nozzles selected for discharging the droplets;
   an arrangement information generation unit configured and arranged to generate second arrangement information, in which the first arrangement information is corrected based on the nozzle information, by correcting the first arrangement information so that at least one of the nozzles for each of the pixel regions is selected not to discharge the liquid material according to rankings of the nozzles, and at least one of the nozzles is selected to discharge the liquid material to make up for a deficiency in the liquid material discharged onto each of the pixel regions; and
   a droplet discharge device configured and arranged to select one of the first arrangement information and the second arrangement information and to discharge droplets of the liquid material on each of the pixel regions from the nozzles according to the one of the first arrangement information and the second arrangement information selected.

2. The drawing system according to claim 1, wherein
   the memory unit is configured and arranged to store the nozzle information in which the landing position deviation is divided into a component corresponding to a direction of the relative movement and a component corresponding to a direction orthogonal to the direction of the relative movement, and
   the arrangement information generation unit is further configured to generate the second arrangement information by correcting the first arrangement information so that a relative discharge position of a selected one of the nozzles with respect to the substrate is offset according to a direction of the landing position deviation of the selected one of the nozzles.

3. The drawing system according to claim 1, wherein
   the memory unit is configured and arranged to store the first arrangement information that includes a drive condition of an energy generation unit provided with each of the nozzles to generate energy for discharging the droplets from a corresponding one of the nozzles, and
   the arrangement information generation unit is configured and arranged to generate the second arrangement information by changing the drive condition of the energy generation unit in the first arrangement information when the corresponding one of the nozzles has a discharge characteristic relating to at least one of the discharge quantity abnormality and the landing position deviation.

4. The drawing system according to claim 3, wherein
   the memory unit is configured and arranged to store the nozzle information in which the discharge quantity abnormality is classified into one of an excessively large landing diameter and an excessively small landing diameter of the droplet, and
   the arrangement information generation unit is configured and arranged to vary a drive voltage of the energy generation unit contained in the first arrangement information according to whether a landing diameter of the droplet is excessively large or excessively small.

5. The drawing system according to claim 3, wherein
   the memory unit is configured and arranged to store the nozzle information in which the landing position deviation is ranked according to a deviation amount in at least a direction of the relative movement, and
   the arrangement information generation unit is configured and arranged to vary a discharge timing of the energy generation unit contained in the first arrangement information according to the deviation amount.

6. The drawing system according to claim 5, wherein
   the memory unit is configured and arranged to store the nozzle information in which the deviation amount is classified according to a forward direction or a backward direction with respect to a forward movement and a reverse movement of the relative movement.

7. The drawing system according to claim 1, further comprising
   an imaging mechanism configured and arranged to observe and capture an image of the droplets discharged from the nozzles and landed on a landing observation discharge object,
   an image processing unit configured and arranged to convert the image captured by the imaging mechanism to image information, and a nozzle information generation unit configured and arranged to generate the nozzle information from the image information.

8. The drawing system according to claim 7, wherein the landing observation discharge object is a recording paper.

9. The drawing system according to claim 7, wherein
the imaging mechanism is further configured and arranged to observe the pixel regions of the substrate to capture an image of at least some of the pixel regions over which the nozzles scan through one cycle of the relative movement among the pixel regions in which the liquid material is discharged and drawn, and
the nozzle information generation unit is further configured and arranged to identify a defective nozzle based on the image information and to update the nozzle information based on information of the defective nozzle.

10. A liquid material drawing method for discharging a liquid material including a functional material from a plurality of nozzles to a plurality of pixel regions on a substrate in synchronization with a relative movement of the substrate and the nozzles to form pixel formation elements, the liquid material drawing method comprising:
storing at least nozzle information in which the nozzles are ranked according to discharge characteristics and first arrangement information that indicates an arrangement of each of the nozzles with respect to each of the pixel regions in the relative movement, the discharge characteristics including landing position deviation of the droplets, discharge quantity abnormality, and missing discharge, and the first arrangement information including selection information indicative of the nozzles selected for discharging the droplets;
generating second arrangement information, in which the first arrangement information is corrected based on the nozzle information, by correcting the first arrangement information so that at least one of the nozzles for each of the pixel regions is selected not to discharge the liquid material according to rankings of the nozzles, and at least one of the nozzles is selected to discharge the liquid material to make up for a deficiency in the liquid material discharged onto each of the pixel regions;
selecting one of the first arrangement information and the second arrangement information; and
discharging droplets of the liquid material on each of the pixel regions from the nozzles according to the one of the first arrangement information and the second arrangement information selected.

11. The liquid material drawing method according to claim 10, wherein
the storing of the first arrangement information includes storing the first arrangement information that includes a drive condition of an energy generation unit provided with each of the nozzles to generate energy for discharging the droplets from a corresponding one of the nozzles, and
the generating of the second arrangement information includes generating the second arrangement information by changing the drive condition of the energy generation unit in the first arrangement information when the corresponding one of the nozzles has a discharge characteristic relating to at least one of the discharge quantity abnormality and the landing position deviation.

12. The liquid material drawing method according to claim 11, wherein
the storing of the nozzle information includes storing the nozzle information in which the discharge quantity abnormality is classified into one of an excessively large landing diameter and an excessively small landing diameter of the droplet, and
the generating of the second arrangement information includes varying a drive voltage of the energy generation unit contained in the first arrangement information according to whether a landing diameter of the droplet is excessively large or excessively small.

13. The liquid material drawing method according to claim 11, wherein
the storing of the nozzle information includes storing the nozzle information in which the landing position deviation is ranked according to a deviation amount in at least a direction of the relative movement, and
the generating of the second arrangement information includes varying a discharge timing of the energy generation unit contained in the first arrangement information according to the deviation amount.

14. The liquid material drawing method according to claim 13, wherein
the storing of the nozzle information includes storing the nozzle information in which the deviation amount is classified according to a forward direction or a backward direction with respect to a forward movement and a reverse movement of the relative movement.

15. The liquid material drawing method according to claim 10, further comprising
observing and capturing an image of the droplets discharged from the nozzles and landed on a landing observation discharge object,
converting the image captured to image information, and
generating the nozzle information from the image information 16. The liquid material drawing method according to claim 15, wherein
the landing observation discharge object is a recording paper.

17. The liquid material drawing method according to claim 10, further comprising
observing the pixel regions of the substrate to capture an image of at least some of the pixel regions over which the nozzles scan through one cycle of the relative movement among the pixel regions in which the liquid material is discharged and drawn,
identifying a defective nozzle based on the image information, and
updating the nozzle information based on information of the defective nozzle.

18. A method for manufacturing a color filter having at least three colors of color layers in the pixel regions partitioned on the substrate, the color filter manufacturing method comprising:
performing the liquid material drawing method according to claim 10 to discharge and draw at least three colors of the liquid material in the pixel regions with the liquid material including a color layer formation material; and
curing the liquid material discharged and drawn on the substrate to form the at least three colors of the color layers.

19. A method for manufacturing an organic EL element having at least a luminescent layer in the pixel regions partitioned on the substrate, the organic EL manufacturing method comprising:
performing the liquid material drawing method according to claim 10 to discharge and draw the liquid material including a luminescent layer formation material in the pixel regions; and curing the liquid material discharged and drawn on the substrate to form the luminescent layer.

20. A liquid material drawing method for discharging a liquid material including a functional material from a plurality of nozzles to a plurality of pixel regions on a substrate in synchronization with a relative movement of the substrate and the nozzles to form pixel formation elements, the liquid material drawing method comprising:

storing at least nozzle information in which the nozzles are ranked according to discharge characteristics and first arrangement information that indicates an arrangement of each of the nozzles with respect to each of the pixel regions in the relative movement, the storing of the nozzle information including storing the nozzle information in which landing position deviation of the droplets is divided into a component corresponding to a direction of the relative movement and a component corresponding to a direction orthogonal to the direction of the relative movement;

generating second arrangement information, in which the first arrangement information is corrected based on the nozzle information, by correcting the first arrangement information so that a relative discharge position of a selected one of the nozzles with respect to the substrate is offset according to a direction of the landing position deviation of the selected one of the nozzles;

selecting one of the first arrangement information and the second arrangement information; and discharging droplets of the liquid material on each of the pixel regions from the nozzles according to the one of the first arrangement information and the second arrangement information selected.

* * * * *